United States Patent
Takayama et al.

(10) Patent No.: US 6,678,123 B2
(45) Date of Patent: Jan. 13, 2004

(54) ROTARY MAGNETIC HEAD MECHANISM WITH THE HEAD HAVING A SMOOTH FLAT FACE THAT EXTENDS PERPENDICULARLY TO THE DIAMETRICAL DIRECTION OF THE ROTARY DRUM AND FURTHER HAVING A RECORD/PLAYBACK ELEMENT DISPOSED IN A RANGE OF CONTACT OF THE FACE WITH A TAPE MEDIUM

(75) Inventors: Jun Takayama, Tokyo (JP); Yasuo Sugizaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 09/951,273

(22) Filed: Sep. 13, 2001

(65) Prior Publication Data

US 2002/0085315 A1 Jul. 4, 2002

(30) Foreign Application Priority Data

Sep. 14, 2000 (JP) .................... 2000-280752

(51) Int. Cl.[7] ................................. G11B 5/52
(52) U.S. Cl. .................................. 360/271.5
(58) Field of Search ......................... 360/271.5

(56) References Cited

U.S. PATENT DOCUMENTS

| | | | |
|---|---|---|---|
| 3,171,903 A | * | 3/1965 | Wheeler .................. 360/271.5 |
| 5,173,820 A | | 12/1992 | Yoneda |
| 5,223,992 A | | 6/1993 | Mitsuhashi |
| 5,247,404 A | | 9/1993 | Takeda |
| 6,108,165 A | * | 8/2000 | Maruyama ............... 360/271.5 |

* cited by examiner

Primary Examiner—A. J. Heinz
(74) Attorney, Agent, or Firm—Frommer Lawrence & Haug LLP; William S. Frommer

(57) ABSTRACT

A magnetic head, a recording and/or playback method for a tape-type magnetic recording medium and a rotary magnetic head mechanism which are simple in structure and superior in contact characteristic with a tape-type magnetic recording medium. A window portion is formed in a concave manner on an outer circumferential face of a rotary drum along which a magnetic tape can be wrapped. A flat head of a width smaller than that of the window portion in the advancing direction is disposed in the window portion such that a pair of channels each in the form of an air gap are formed between the opposite leading and trailing ends of the flat head and the opposite leading and trailing ends of the window portion, respectively. The flat head has an exposed smooth flat face extending perpendicularly to a diametrical direction of the rotary drum and provided at a position retracted from the outer circumferential face of the rotary drum for being opposed to and fluidically interference with the magnetic tape. A head element for contacting and magnetically interference with the magnetic tape is disposed on the smooth flat face within a range within which the magnetic tape contacts with the smooth flat face.

14 Claims, 13 Drawing Sheets

ROTARY MAGNETIC HEAD MECHANISM WITH THE HEAD HAVING A SMOOTH FLAT FACE THAT EXTENDS PERPENDICULARLY TO THE DIAMETRICAL DIRECTION OF THE ROTARY DRUM AND FURTHER HAVING A RECORD/PLAYBACK ELEMENT DISPOSED IN A RANGE OF CONTACT OF THE FACE WITH A TAPE MEDIUM

BACKGROUND OF THE INVENTION

This invention relates to a magnetic head, a recording and/or playback method for a tape-type magnetic recording medium and a rotary magnetic head mechanism.

Various apparatus for recording and playing back a signal onto and from a tape-type magnetic recording medium are known and widely used. An exemplary one of apparatus of the type mentioned is a video cassette recorder apparatus of a rotary drum type wherein a magnetic head mounted on a rotating drum forms and records a track having an inclination angle on a tape-type magnetic recording medium and further traces and plays back the inclined track. Particularly recently, a video tape recorder (VTR) apparatus compliant with digital standards has been popularized.

One of tape-type magnetic recording media is a coat-type magnetic tape. The coat-type magnetic tape has a structure wherein a magnetic layer or a magnetic face is formed on a plastic base material by applying acicular or particulate magnetic powder to the plastic base material using a binder as an adhesive. The magnetic face of the coat-type magnetic tape has a coercive force Hc and a residual magnetic flux density Br which are inclined to increase as the recording density increases. For example, with an MP tape compliant with the DV standards, the coercive force Hc reaches 2,300 oersted and the residual magnetic flux density reaches 3,000 gauss.

On the other hand, the size of the simple substance of the magnetic powder decreases to 0.1×1.0 µm with a coat-type metal tape. Further, as regards the tape thickness, while tapes of approximately 10 to 16 µm thick are conventionally used on editing machines, the tape thickness is decreased in order to satisfy the demand for miniaturization of a tape cassette and for recording and playback for a long period of time. Now, the tape thickness of a tape-type magnetic recording medium for a digital video signal compliant with the DV standards is 7 to 8 µm.

Therefore, it is necessary for an apparatus for recording/playing back onto/from a magnetic tape of such a characteristic as just described to be contrived in terms of a fluidic interference function relating to control of physical contact with the magnetic tape and a magnetic interference function relating to recording/playback.

An exemplary one of magnetic tape recording/playback apparatus of the type described is a rotary magnetic head mechanism which records/plays back onto/from a magnetic tape medium while rotating. A conventional rotary magnetic head mechanism of the type just mentioned adopts a magnetic head which operates in accordance with the principle of magnetic induction. In the magnetic head, magnetic poles are opposed to each other with a very small head gap left therebetween, and a magnetic face of a magnetic tape medium is disposed perpendicularly to and very close to the head gap. Upon recording, magnetic lines of force generated from the magnetic poles when they are driven magnetize a magnetic substance which forms the magnetic face of the magnetic tape medium while the magnetic lines of force pass from one to the other of the magnetic poles through the head gap and the magnetic face to record on the magnetic tape medium. On the other hand, upon playback, leakage fluxes generated from the magnetic substance which forms the magnetic face of the magnetic tape medium are caught through the head gap by the magnetic poles to detect an electromotive force generated by electromagnetic induction when the leakage fluxes vary as the magnetic tape medium is fed.

In order to raise the recording density and assure a high S/N (signal to noise) ratio, it is necessary for the magnetic tape medium to closely contact with the head gap and besides it is necessary to maintain stable movement of the tape while such close contact of the tape is maintained.

Conventionally, in order to realize the close contacting state described above, the magnetic tape medium is pressed against the head gap to obtain a necessary contact pressure. Particularly with a rotary magnetic head mechanism, the contact pressure is obtained by a tension applied to the magnetic tape medium. FIGS. 11 to 13 show a configuration of a conventional rotary magnetic head mechanism of the type described.

Referring to FIGS. 11 to 13, a rotary magnetic head mechanism 100 shown includes a cylindrical rotary drum 101 having a head window 102 formed in a recessed relationship therein such that it is open on a part of circumferential face of the cylindrical rotary drum 101, and a magnetic head 104 having a head gap 103 and disposed in the head window 102. The rotary magnetic head mechanism 100 is rotated at a predetermined speed in a rotational direction 106. Upon rotation of the rotary magnetic head mechanism 100, also the magnetic head 104 moves at an equal speed. Tension 107 is applied to a magnetic tape medium 105 which extends along the rotary drum 101 such that the magnetic tape medium 105 is pressed against the head gap 103 by the tension 107 and therefore is fed in the same direction at a speed lower than that of the magnetic head 104. A cylindrical fixed drum 111 is disposed in a little spaced relationship below the rotary drum 101.

In order to assure a good contact state between the head gap 103 and the magnetic tape medium 105, a face 108 of the rotary magnetic head mechanism 100 around the head gap 103 along which the rotary magnetic head mechanism 100 contacts with the magnetic tape medium 105 is formed as a curved face of a curvature 109 which is convex in a recording track direction, that is, a magnetic tape feeding direction and is formed also as a curved face of a curvature 110 which is convex also in a track width direction and besides the face 108 projects from the cylindrical face of the rotary drum 101 together with the head gap 103.

When the magnetic tape medium 105 contacts with the magnetic head 104 having the configuration just described with a pressing force caused by the tension 107, the magnetic tape medium 105 is deformed into a convex shape along the face 108 of the magnetic head 104 and a good contact state between the magnetic head 104 and the magnetic tape medium 105 can be assured. Meanwhile, a portion of the magnetic tape medium 105 which does not contact with the magnetic head 104 is sometimes deformed by the gaps between the head window 102 and the rotary drum 101 and fixed drum 111.

As described above, the rotary magnetic head mechanism 100 of the conventional configuration applies sufficient tension 107 to the magnetic tape medium 105 to compulsorily press the magnetic tape medium 105 against the magnetic head 104 of a convex shape to assure a good contact state between them thereby to make use of magnetic interference between the magnetic head 104 and the magnetic tape medium 105 to effect magnetic recording or playback of the magnetic tape medium 105.

The rotary magnetic head mechanism 100, however, has a problem that, since the magnetic tape medium 105 is compulsorily pressed against the magnetic head 104 of a convex shape as described above, the head gap 103 is liable to be abraded by the magnetic tape medium 105, resulting in a reduction of the life of the head gap 103. Simultaneously, there is another problem that the magnetic face of the magnetic tape medium 105 is liable to be abraded similarly and suffer from irreversible deformation, resulting in reduction of the life of the magnetic tape medium 105.

Therefore, in order to assure a long life of the head, the rotary magnetic head mechanism 100 is conventionally designed such that the depthwise dimension of the head gap 103, that is, the gap depth, is set so deep as to have a suitable margin. In particular, for example, the gap depth is initially set as deep as 20 to 30 μm to assure a long interval of time until the gap depth is decreased to its limit value by abrasion of the magnetic head 104 thereby to assure a long life of the rotary magnetic head mechanism 100.

However, the countermeasure that the initial gap depth is set deep as described above is disadvantageous in that there is a limit to improvement in sensitivity and high density recording cannot be anticipated while there is a limitation to high density playback. Further, the countermeasure is not effective to eliminate the disadvantage of the reduction of the life of the tape described above.

Furthermore, the countermeasure does not provide measures for applying, to a tape-type magnetic recording medium, an MR head or a GMR head of the magneto-resistance effect type (or the magnetic flux response type) which is applied principally to magnetic hard disk apparatus (HDD: hard disk drive) and makes use of a magneto-resistance effect to detect a magnetic field variation on a recording medium with a very shallow gap depth.

SUMMARY OF THE INVENTION

It is an object of the present invention to provide a magnetic head, a recording and/or playback method for a tape-type magnetic recording medium and a rotary magnetic head mechanism by which a good contact state between the head and a tap medium can be assured with a decreased contact pressure to reduce the abrasion of the head and the tape medium to assure a long life for the head and the tape.

It is another object of the present invention to provide a magnetic head, a recording and/or playback method for a tape-type magnetic recording medium and a rotary magnetic head mechanism by which a head of the magneto-resistance effect type can be applied to a tape medium.

In order to attain the objects described above, according to an aspect of the present invention, there is provided a magnetic head mounted on a rotary drum having an outer circumferential face along which a tape-type magnetic recording medium can be wrapped such that the magnetic head moves by rotation of the rotary drum and contacts with the tape-type magnetic recording medium to record or play back the tape-type magnetic recording medium, having a face portion opposing to the tape-type magnetic recording medium when the magnetic head moves, and a recording and/or playback element for contacting with the tape-type magnetic recording medium to perform at least one of magnetic recording and playback of the tape-type magnetic recording medium, the face portion being a smooth flat face which extends perpendicularly to a diametrical direction of the rotary drum and is positioned on the inner circumferential side retracted from the outer circumferential face of the rotary drum, the recording and/or playback element being disposed within a range of the face portion within which the tape-type magnetic recording medium contacts.

In the magnetic head, the face portion formed from a smooth flat face for fluidically interfering with a tape-type magnetic recording medium extends perpendicularly to a diametrical direction of the rotary drum and is positioned on the inner circumferential side retracted from the outer circumferential face of the rotary drum so as to form a recessed portion such that the tape-type magnetic recording medium is contacted with the face portion, and the recording and/or playback element for magnetically interfering with the tape-type magnetic recording medium is disposed within a range of the face portion within which the tape-type magnetic recording medium contacts. When the drum rotates, the pressure within the recessed portion formed by the smooth flat face is decreased, and consequently, the tape-type magnetic recording medium is attracted toward the smooth flat face of the rotary drum. Since the magnetic head includes the smooth flat face extending perpendicularly to a diametrical direction of the rotary drum, when the rotary drum rotates, the smooth flat face advances in a tangential direction to the rotary drum, whereupon an air flow is formed in the tangential direction on the smooth flat face. Meanwhile, the tape-type magnetic recording medium approaches the smooth flat face by the attraction as described above. As a result, pressure reduction in accordance with the Bernoulli's theorem occurs with the air flow which flows in a narrow path defined by the tape-type magnetic recording medium and the smooth flat face, and due to the pressure reduction effect, the tape-type magnetic recording medium gradually approaches and contacts with the smooth flat face. Consequently, the tape-type magnetic recording medium contacts with the recording and/or playback element without applying compulsory force to the tape-type magnetic recording medium. In this manner, the tape-type magnetic recording medium having approached the smooth flat face by the attracting action of the recessed portion can be contacted with the smooth flat face with a suitable contact pressure only by the pressure reduction effect of the air flow generated naturally by the advancement of the smooth flat face. Consequently, recording or playback can be performed while suppressing abrasion of the tape-type magnetic recording medium and the magnetic head.

According to another aspect of the present invention, there is provided a magnetic head mounted on a rotary drum having an outer circumferential face along which a tape-type magnetic recording medium can be wrapped such that the magnetic head is smaller in size than and is disposed in an exposed state in a window portion formed in a concave state on the outer circumferential face of the rotary drum with a pair of air gaps formed between the magnetic head and the opposite ends of the window portion and that the magnetic head moves by rotation of the rotary drum and contacts with the tape-type magnetic recording medium to record or play hack the tape-type magnetic recording medium, having a face portion opposing to the tape-type magnetic recording medium when the magnetic head moves, and a recording and/or playback element for contacting with the tape-type magnetic recording medium to perform at least one of magnetic recording and playback of the tape-type magnetic recording medium, the face portion being a smooth flat face which extends perpendicularly to a diametrical direction of the rotary drum and is positioned on the inner circumferential side retracted from the outer circumferential face of the rotary drum, the recording and/or playback element being disposed within a range of the face portion within which the tape-type magnetic recording medium contacts.

In the magnetic head, the face portion having a size smaller than a window portion formed in a concave state on the outer circumferential face of the rotary drum for fluidically interfering with a tape-type magnetic recording medium is disposed as a smooth flat face which extends perpendicularly to a diametrical direction of the rotary drum and is positioned on the inner circumferential side retracted from the outer circumferential face of the rotary drum so as to form a pair of air gaps between the opposite ends of the window portion and the opposite ends of the face portion, and the recording and/or playback element for magnetically interfering with the tape-type magnetic recording medium is disposed within a range of the face portion within which the tape-type magnetic recording medium contacts. When the drum rotates, the pressures within the air gaps formed between the opposite ends of the magnetic head and the opposite ends of the window portion are reduced, and consequently, the tape-type magnetic recording medium is effectively attracted toward the smooth flat face of the rotary drum.

Meanwhile, since the magnetic head configured as described above includes the smooth flat face extending perpendicularly to a diametrical direction of the rotary drum and positioned on the inner circumferential side retracted from the outer circumferential face of the rotary drum, when the rotary drum rotates, the smooth flat face advances in a tangential direction to the rotary drum, whereupon an air flow is formed in the tangential direction on the smooth flat face. Meanwhile, the tape-type magnetic recording medium approaches the smooth flat face positioned on the inner circumferential side retracted from the outer circumferential face of the rotary drum by the attraction as described above. As a result, the air flow which flows in the tangential direction on the smooth flat face flows along a narrow path defined by the tape-type magnetic recording medium and the smooth flat face, and consequently, pressure reduction in accordance with the Bernoulli's theorem occurs with the air flow. Thus, due to the pressure reduction effect, the tape-type magnetic recording medium gradually approaches and contacts with the smooth flat face. Consequently, the tape-type magnetic recording medium contacts with a contact pressure with the recording and/or playback element without applying compulsory force to the tape-type magnetic recording medium. In this manner, the tape-type magnetic recording medium having approached the smooth flat face by the attracting action of the recessed portion can be contacted with the smooth flat face with a suitable contact pressure only by the pressure reduction effect of the air flow generated naturally by the advancement of the smooth flat face. Consequently, recording or playback can be performed while suppressing abrasion of the tape-type magnetic recording medium and the magnetic head.

In either of the magnetic heads, the face portion may be formed from a smooth curved face having a curvature more moderate than that of the rotary drum and having a tangential direction at least at one position on the smooth curved face which extends perpendicularly to a diametrical direction of the rotary drum.

The state of the air flow which provides the pressure reduction effect relies upon the shape and the smoothness of the face portion, and where the smoothness is the same, the pressure reduction effect by an air flow generated by a smooth curved face of a moderate curvature is higher than the pressure reduction effect by an air flow generated by a smooth curved face of a greater curvature. In the magnetic head, since the face portion is formed from a smooth curved face having a curvature more moderate than that of the rotary drum and having a tangential direction at least at one position on the smooth curved face which extends perpendicularly to a diametrical direction of the rotary drum, an air flow is formed in the same direction as the advancing direction of the magnetic head on the smooth flat face. Consequently, by a pressure reduction effect in accordance with the Bernoulli's theorem caused by the air flow between the tape-type magnetic recording medium and the smooth curved face of a moderate curvature of the magnetic head, the approaching tape-type magnetic recording medium can be contacted with the smooth curved face and consequently with the recording and/or playback element.

According to a further aspect of the present invention, there is provided a recording and/or playback method for a tape-type magnetic recording medium, comprising the steps of wrapping the tape-type magnetic recording medium around a cylindrical rotary drum including a magnetic head which has a smooth flat face extending perpendicularly to a diametrical direction of the rotary drum or a smoothed curved face having a curvature more moderate than that of the rotary drum and having a tangential direction at least at one position thereof which extends perpendicularly to a diametrical direction of the rotary drum, the magnetic head being disposed such that the smooth flat face or smooth curved face is exposed at a position on the inner circumferential side retracted from an outer circumferential face of the rotary drum, the smooth flat face or smooth curved face having a recording and/or playback element disposed thereon for magnetically interfering with the tape-type magnetic recording medium, and causing the tape-type magnetic recording medium to contact with the recording and/or playback element by pressure reduction caused by fluidic interference between the smooth flat face or smooth curved face and the tape-type magnetic recording medium to execute at least one of recording and playback of the tape-type magnetic recording medium.

In the recording and/or playback method, the smooth flat face or smoothed curved face having a moderate curvature is positioned on the inner circumferential side retracted from the outer circumferential face of the rotary drum so as to form a recessed portion. When the drum rotates, the pressure within the recessed portion is reduced, and consequently, the tape-type magnetic recording medium is attracted toward the smooth flat face or smooth curved face of the rotary drum.

Since the smooth flat face extends perpendicularly to a diametrical direction of the rotary drum or the smoothed curved face has a tangential direction at least at one position thereof which extends perpendicularly to a diametrical direction of the rotary drum, when the rotary drum rotates, the smooth flat face or smooth curved face advances in a direction perpendicular to a diametrical direction of the rotary drum, whereupon an air flow is formed in the advancing direction on the smooth flat face or smooth curved face.

When the tape-type magnetic recording medium approaches the smooth flat face by the attraction described above, the air flow flows along a narrow path defined by the tape-type magnetic recording medium and the smooth flat face or by the tape-type magnetic recording medium and the smooth curved face. As a result, pressure reduction in accordance with the Bernoulli's theorem occurs with the air flow, and due to the pressure reduction effect, the tape-type magnetic recording medium gradually approaches and contacts with the smooth flat face or smooth curved face. Consequently, the tape-type magnetic recording medium contacts with a contact pressure with the recording and/or playback element without applying compulsory force to the tape-type magnetic recording medium. In this manner, the tape-type magnetic recording medium can be contacted with the smooth flat face with a suitable contact pressure only by the pressure reduction effect of the air flow generated naturally by the advancement of the smooth flat face or smooth curved face. Consequently, recording or playback can be performed while suppressing abrasion of the tape-type magnetic recording medium and the magnetic head.

According to a still further aspect of the present invention, there is provided a recording and/or playback method for a tape-type magnetic recording medium, comprising the steps of wrapping the tape-type magnetic recording medium around a rotary drum having an outer circumferential face along which a tape-type magnetic recording medium can be wrapped and having a window portion formed in a concave state on the outer circumferential face thereof, the rotary drum including a magnetic head which has a smooth flat face of a size smaller than the window portion or a smoothed curved face having a curvature more moderate than that of the rotary drum, the rotary drum being disposed in the window portion such that the smooth flat face or smooth curved face is exposed at a position on the inner circumferential side retracted from an outer circumferential face of the rotary drum with a pair of air gaps formed between the magnetic head and the opposite ends of the window portion, the smooth flat face extending perpendicularly to a diametrical direction of the rotary drum or the smooth curved face having a tangential direction at least at one position thereof which extends perpendicularly to a diametrical direction of the rotary drum, the smooth flat face or smooth curved face having a recording and/or playback element disposed thereon for magnetically interfering with the tape-type magnetic recording medium, and causing the tape-type magnetic recording medium to contact with the recording and/or playback element by pressure reduction caused by fluidic interference between the smooth flat face or smooth curved face and the tape-type magnetic recording medium to execute at least one of recording and playback of the tape-type magnetic recording medium.

In the recording and/or playback method, when the rotary drum rotates, the pressures within the air gaps formed between the opposite ends of the smooth flat face or smooth curved face and the opposite ends of the window portion are reduced. Consequently, the tape-type magnetic recording medium is effectively attracted toward the smooth flat face or smooth curved face of the rotary drum.

Since the smooth flat face extends perpendicularly to a diametrical direction of the rotary drum or the smoothed curved face has a tangential direction at least at one position thereof which extends perpendicularly to a diametrical direction of the rotary drum, when the rotary drum rotates, the smooth flat face or smooth curved face advances in a direction perpendicular to a diametrical direction of the rotary drum, whereupon an air flow is formed in the advancing direction on the smooth flat face or smooth curved face.

When the tape-type magnetic recording medium approaches the smooth flat face or smooth curved face, which is positioned on the inner circumferential side retracted from the outer circumferential face of the rotary drum, by the attraction described above, the air flow flows along a narrow path defined by the tape-type magnetic recording medium and the smooth flat face or by the tape-type magnetic recording medium and the smooth curved face. As a result, pressure reduction in accordance with the Bernoulli's theorem occurs with the air flow, and due to the pressure reduction effect, the tape-type magnetic recording medium gradually approaches and contacts with the smooth flat face or smooth curved face. Consequently, the tape-type magnetic recording medium contacts with a contact pressure with the recording and/or playback element without applying compulsory force to the tape-type magnetic recording medium. In this manner, the tape-type magnetic recording medium can be contacted with the smooth flat face with a suitable contact pressure only by the pressure reduction effect of the air flow generated naturally by the advancement of the smooth flat face or smooth curved face. Consequently, recording or playback can be performed while suppressing abrasion of the tape-type magnetic recording medium and the magnetic head.

According to a yet further aspect of the present invention, there is provided a rotary magnetic head mechanism, comprising a rotary drum mounted for rotation and having an outer circumferential face along which a tape-type magnetic recording medium can be wrapped, and a magnetic head mounted on the rotary drum and having a face portion movable by rotation of the rotary drum and opposing to the tape-type magnetic recording medium to fluidically interfere with the tape-type magnetic recording medium and a recording and/or playback element for contacting and magnetically interfering with the tape-type magnetic recording medium to execute at least one of recording and playback of the tape-type magnetic recording medium, the face portion being a smooth flat face which extends perpendicularly to a diametrical direction of the rotary drum and is positioned on the inner circumferential side retracted from the outer circumferential face of the rotary drum, the recording and/or playback element being disposed within a range of the face portion within which the tape-type magnetic recording medium contacts the face portion with fluidic interference.

In the rotary magnetic head mechanism, the face portion formed from a smooth flat face for fluidically interfering with a tape-type magnetic recording medium extends perpendicularly to a diametrical direction of the rotary drum and is positioned on the inner circumferential side retracted from the outer circumferential face of the rotary drum so as to form a recessed portion and the recording and/or playback element for magnetically interfering with the tape-type magnetic recording medium is disposed within a range of the face portion within which the tape-type magnetic recording medium contacts. When the drum rotates, the pressure within the recessed portion decreased, and consequently, the tape-type magnetic recording medium is attracted toward the smooth flat face of the rotary drum. This is a first stage.

Meanwhile, since the smooth flat face of the magnetic head extends perpendicularly to a diametrical direction of he rotary drum, when the rotary drum rotates, the smooth flat face advances in a tangential direction thereto, whereupon an air flow is formed in the tangential direction on the smooth flat face. The air flow flows along a narrow path defined by the smooth flat face and the tape-type magnetic recording medium having approached the smooth flat face at the retracted position by the attraction described above. As a result, pressure reduction in accordance with the Bernoulli's theorem occurs with the air flow. Due to the pressure reduction effect, the tape-type magnetic recording medium gradually approaches and contacts with the smooth flat face. Consequently, the tape-type magnetic recording medium contacts with a contact pressure with the recording and/or playback element. This is a second stage In this manner, thanks to a synergetic effect of the first and second stages provided only by rotation of the rotary drum, the tape-type magnetic recording medium can be contacted with the recording and/or playback element with a suitable contact pressure only by an effect of the air flow generated naturally without the necessity for applying compulsory force. Consequently, recording or playback can be performed while suppressing abrasion of the tape-type magnetic recording medium and the magnetic head.

According to a yet further aspect of the present invention, there is provided a rotary magnetic head mechanism, comprising a cylindrical rotary drum having an outer circumferential face along which a tape-type magnetic recording medium can be wrapped and which rotates at a predetermined linear velocity in a tangential direction and a window portion formed in a concave state on the outer circumferential face, and a magnetic head having a size smaller than the window portion and disposed in the window portion such that a pair of air gaps having an equal width are formed between the opposite leading and trailing ends of the magnetic head on the one hand and the opposite leading and trailing ends of the window portion on the other hand, respectively, the magnetic head advancing in a predetermined advancing direction by rotation of the outer circumferential face of the rotary drum, the magnetic head having a smooth flat face which extends perpendicularly to a diametrical direction of the rotary drum and is positioned on the inner circumferential side retracted from the outer circumferential face of the rotary drum such that the smooth flat face moves by rotation of the rotary drum and is opposed to the tape-type magnetic recording medium to fluidically interfere with the tape-type magnetic recording medium and a recording and/or playback element disposed on the trailing side with respect to the center on the smooth flat face in the advancing direction for contacting and magnetically interfering with the tape-type magnetic recording medium to execute at least one of recording and playback of the tape-type magnetic recording medium.

In the rotary magnetic head mechanism, the face portion having a size smaller than a window portion formed in a concave state on the outer circumferential face of the rotary drum for fluidically interfering with a tape-type magnetic recording medium is disposed as a smooth flat face which extends perpendicularly to a diametrical direction of the rotary drum and is positioned on the inner circumferential side retracted from the outer circumferential face of the rotary drum so as to form a pair of air gaps between the opposite ends of the window portion and the opposite ends of the face portion, and the recording and/or playback element for magnetically interfering with the tape-type magnetic recording medium is disposed on the trailing side with respect to the center on the smooth flat face. When the drum rotates, the pressures within the air gaps having an equal width and formed between the opposite ends of the magnetic head and the opposite ends of the window portion are reduced, and consequently, the tape-type magnetic recording medium is attracted toward the smooth flat face of the rotary drum positioned on the inner circumferential side retracted from the outer circumferential face of the rotary drum. However, the peak of an attraction locus is displaced to the trailing side with respect to the center by the inertia of the tape-type magnetic recording medium.

Meanwhile, since the smooth flat face of the magnetic head extends perpendicularly to a diametrical direction of the rotary drum, when the rotary drum rotates, the smooth flat face advances in a tangential direction to the rotary drum, whereupon an air flow is formed in the tangential direction on the smooth flat face. The air flow flows along a narrow path defined by the smooth flat face and the tape-type magnetic recording medium having approached the smooth flat face by the attraction described above. As a result, pressure reduction in accordance with the Bernoulli's theorem occurs with the air flow. Due to the pressure reduction effect, the tape-type magnetic recording medium gradually approaches the smooth flat face, and in accordance with the displacement of the peak described above, the tape-type magnetic recording medium contacts principally with a portion of the smooth flat face on the trailing side with respect to the center. Consequently, the tape-type magnetic recording medium contacts with a contact pressure with the recording and/or playback element disposed on the trailing side in the advancing direction with respect to the center on the smooth flat face. In this manner, the tape-type magnetic recording medium can be contacted with the recording and/or playback element with a suitable contact pressure only by the pressure reduction effect of the air flow generated naturally without the necessity for applying compulsory force. Consequently, recording or playback can be performed while suppressing abrasion of the tape-type magnetic recording medium and the magnetic head.

Preferably, the smooth flat face is disposed in a displaced relationship to the outer circumference side until the tape-type magnetic recording medium having been contacted with and then spaced away from the smooth flat face passes by the trailing end of the window portion without colliding or contacting with the trailing end of the window portion.

In the rotary magnetic head mechanism, since the smooth flat face is disposed in a displaced relationship to the outer circumference side, the tape-type magnetic recording medium having been contacted with and then spaced away from the smooth flat face passes by the trailing end of the window portion without colliding or contacting with the trailing end of the window portion. Consequently, otherwise possible damage to the tape-type magnetic recording medium can be prevented.

According to a yet further aspect of the present invention, there is provided a rotary magnetic head mechanism, comprising a cylindrical rotary drum having an outer circumferential face along which a tape-type magnetic recording medium can be wrapped and which rotates at a predetermined linear velocity in a tangential direction and a window portion formed in a concave state on the outer circumferential face, and a magnetic head having a size smaller than the window portion and disposed in the window portion such that an air gap formed between a leading end of the magnetic head and a leading end of the window portion has a width smaller than that of another air gap formed between a trailing end of the magnetic head and a trailing end of the window portion, the magnetic head advancing in a predetermined advancing direction by rotation of the outer circumferential face of the rotary drum, the magnetic head having a smooth flat face which extends perpendicularly to a diametrical direction of the rotary drum and is positioned on the inner circumferential side retracted from the outer circumferential face of the rotary drum such that the smooth flat face moves by rotation of the rotary drum and is opposed to the tape-type magnetic recording medium to fluidically interfere with the tape-type magnetic recording medium and a recording and/or playback element disposed within a range on the face portion within which the tape-type magnetic recording medium contacts with the face portion with fluidic interference for contacting and magnetically interfering with the tape-type magnetic recording medium to execute at least one of recording and playback of the tape-type magnetic recording medium.

In the rotary magnetic head mechanism, the face portion having a size smaller than a window portion formed in a concave state on the outer circumferential face of the rotary drum for fluidically interfering with a tape-type magnetic recording medium is disposed as a smooth flat face which extends perpendicularly to a diametrical direction of the rotary drum and is positioned on the inner circumferential side retracted from the outer circumferential face of the rotary drum such that an air gap formed between a leading end of the magnetic head and a leading end of the window portion has a width smaller than that of another air gap formed between a trailing end of the magnetic head and a trailing end if the window portion, and the recording and/or playback element for magnetically interfering with the tape-type magnetic recording medium is disposed within a contact range between the smooth flat face and the tape-type magnetic recording medium. Not only because the smooth flat face which acts to attract the tape-type magnetic recording medium is positioned on the leading side in the direction of rotation in the window portion, but also because, when the drum rotates, the pressure reduction in the air gap of a smaller width on the leading side is greater than the pressure reduction in the air gap of a greater width on the trailing side, the peak of an attraction locus of the tape-type magnetic recording medium attracted toward the smooth flat face positioned on the inner circumferential side retracted from the outer circumferential face of the rotary drum is not displaced to the trailing side with respect to the center by the inertia of the tape-type magnetic recording medium but is formed on the leading side.

Meanwhile, since the smooth flat face of the magnetic head extends perpendicularly to a diametrical direction of the rotary drum, when the rotary drum rotates, the smooth flat face advances in a tangential direction to the rotary drum, whereupon an air flow is formed in the tangential direction on the smooth flat face. The air flow flows along a narrow path defined by the smooth flat face and the tape-type magnetic recording medium having approached the smooth flat face by the attraction described above. As a result, pressure reduction in accordance with the Bernoulli's theorem occurs with the air flow. Due to the pressure reduction effect, the tape-type magnetic recording medium gradually approaches the smooth flat face, and in accordance with the displacement of the peak to the leading side described above, the tape-type magnetic recording medium contacts principally with a portion of the smooth flat face on the leading side with respect to the center. Consequently, the tape-type magnetic recording medium contacts with a contact pressure with the recording and/or playback element disposed on the smooth flat face. In this manner, the tape-type magnetic recording medium can be contacted with the recording and/or playback element with a suitable contact pressure only by the pressure reduction effect of the air flow generated naturally without the necessity for applying compulsory force. Consequently, recording or playback can be performed while suppressing abrasion of the tape-type magnetic recording medium and the magnetic head.

Further, since the position at which the tape-type magnetic recording medium is spaced away from the smooth flat face after the contact with the latter is displaced on the leading side by the displacement of the peak to the leading side described above and besides the tape-type magnetic recording medium when passes by the air gap of a greater width on the trailing side is attracted by comparatively low attracting force because the pressure reduction in the air gap of a greater width on the trailing side is small, the tape-type magnetic recording medium can pass by the trailing end of the window without colliding or contacting with the latter. Consequently, otherwise possible damage to the tape-type magnetic recording medium can be prevented.

In any of the rotary magnetic head mechanisms described above, the face portion opposing to the tape-type magnetic recording medium may be formed from a smooth curved face having a curvature more moderate than that of the rotary drum and having a tangential direction at least at one position thereof which extends perpendicularly to a diametrical direction of the rotary drum. In the rotary magnetic head mechanism, since a tangential direction at least at one position of the smooth curved face extends perpendicularly to a diametrical direction of the rotary drum, an air flow is formed in the same direction as the advancing direction of the magnetic head on the smooth curved face. The air flow flows along a narrow path defined by the tape-type magnetic recording medium and the smooth curved face of a moderate curvature of the magnetic head. As a result, pressure reduction in accordance with the Bernoulli's theorem occurs with the air flow, and by the pressure reduction effect, contact of the tape-type magnetic recording medium with the recording and/or playback element can be assured.

In summary, the following advantages can be achieved by the present invention.
1. Since a synergetic effect is achieved by the first stage wherein the magnetic tape is attracted toward the head by an effect by the channel configuration or by an effect by the configuration wherein the head is positioned at a retracted position and the second stage wherein the pressure reduction effect by an air stream generated naturally on the face of the head when the head rotates is utilized subsequently to contact the attracted magnetic head with the head, a sufficiently low contact pressure to the head which does not have any problem for magnetic recording or playback can be obtained stably.
2. Various problems arising from abrasion of the head can be solved, and a long life can be assured for the head.
3. Increase of the life of the magnetic tape can be achieved simultaneously.
4. Since the abrasion of the head is very small, the gap depth can be reduced as much, and consequently, recording/playback of a high sensitivity and a high density can be anticipated.
5. The head can be formed in a reduced size.
6. A head of the contact type wherein the magnetic tape and the head contact with each other such as, for example, an MR head or a GMR head of the magneto-resistance effect type (or magnetic flux response type) wherein a magnetic field variation on a recording medium can be detected with a very small gap depth making use of a magneto-resistance effect can be applied for recording or playback of a tape-type magnetic recording medium.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
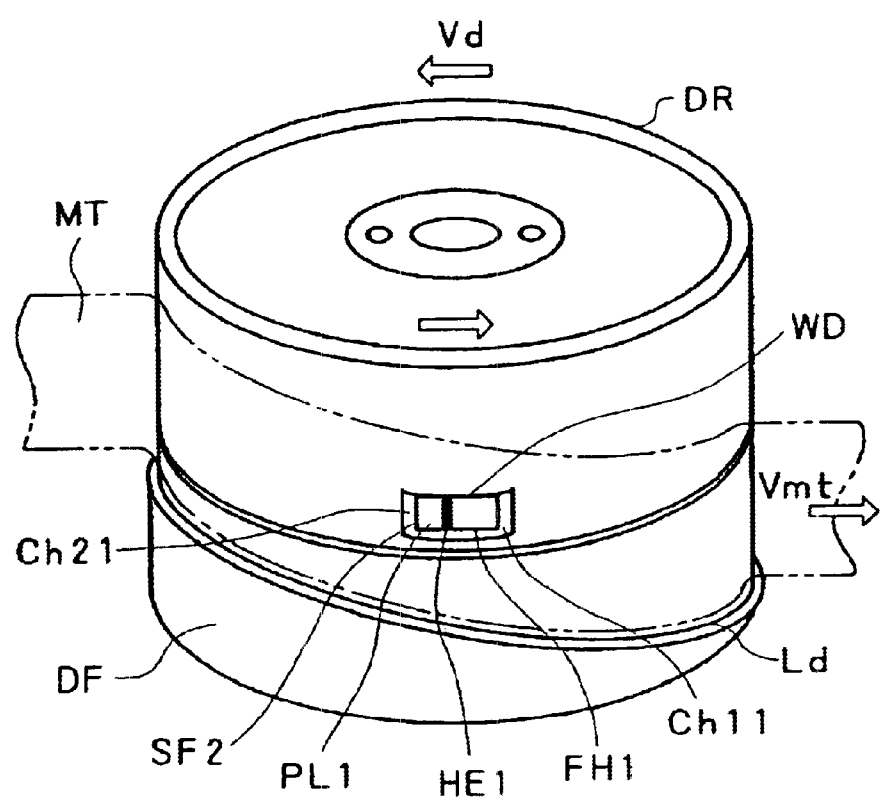
FIG. 1 is a schematic perspective view of part of a rotary magnetic head mechanism to which the present invention is applied.
Figure 2:
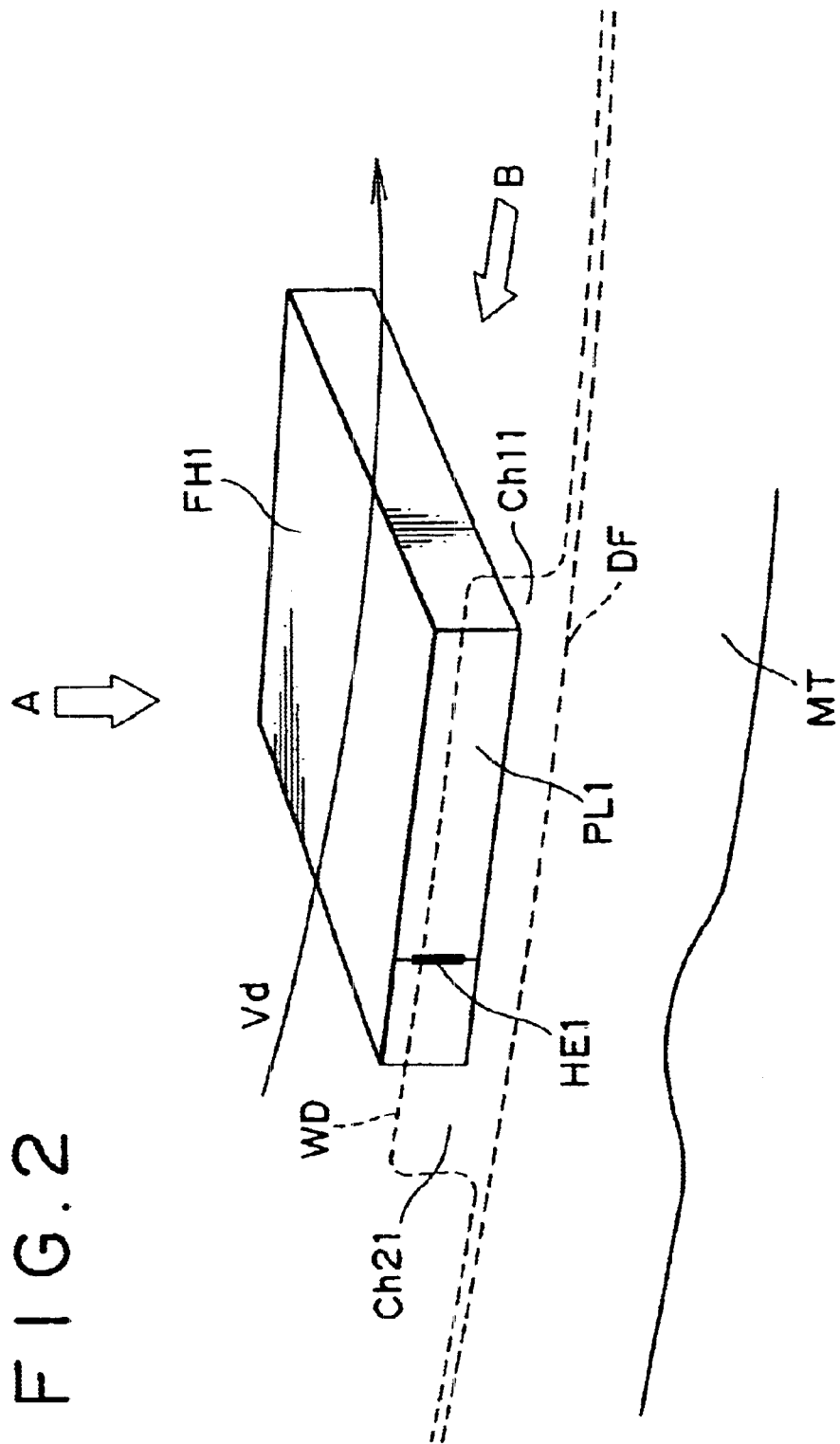
FIG 2 is a schematic view showing a configuration of a magnetic head shown in FIG. 1.

Referring to FIG. 1, there is shown a rotary magnetic head mechanism to which the present invention is applied. The rotary magnetic head mechanism RHA1 includes a rotary drum DR and a fixed drum DF of a cylindrical configuration having a substantially equal diameter and each having a cylindrical face. The rotary drum DR and the fixed drum DF are disposed coaxially with and in the proximity of each other such that one end edge of the cylindrical face of the rotary drum DR and one end edge of the cylindrical face of the fixed drum DF are opposed to each other. The rotary drum DR is a rotatable upper drum while the fixed drum DF is a lower drum fixed to a chassis or a frame.

The rotary drum DR has a cylindrical body rotatable around the axis as an outer circumferential face and is rotated at a predetermined high velocity by a driving mechanism not shown. A plurality of windows WD are formed as concave recesses at predetermined positions of a lower portion of the outer circumferential face of the rotary drum DR, and a flat head FH1 is fitted in each of the windows WD. It is to be noted that, in order to facilitate illustration, only one window WD and one flat head FH1 are shown in FIG. 1. A magnetic tape MT as a tape-type magnetic recording medium is wrapped on part of the outer circumferential face of the rotary drum DR as seen in FIG. 1

More particularly, the magnetic tape MT is wrapped on the outer circumferential face of the rotary drum DR such that it is wrapped, for example, over an approximately half circumference of the rotary drum DR upon rotation of the rotary drum DR while it is not wrapped over the other half circumference of the rotary drum DR and the rotary drum DR moves in a state released from the magnetic tape MT.

Referring to FIGS. 1 to 4, the flat head FH1 has a shape of a substantially rectangular parallelepiped and has an edge retracted diametrically by at a distance dst1 toward the center of rotation of the rotary drum DR from the position of the window WD (the position of the outer circumferential face of the rotary drum DR). The flat head FH1 has a face portion for opposing to or contacting with the magnetic tape MT and fluidically interferes with the opposing magnetic tape MT.

The face portion of the flat head FH1 is formed as a flat face, and the tangential direction at least at one position at which the facial portion opposes to or contacts with the magnetic tape MT extends perpendicularly to a diametrical direction of the rotary drum DR. In the present embodiment, the face of the face portion is formed as a smooth flat face PL1 finished smoothly. Accordingly, all portions of the smooth flat face PL1 do not project diametrically outwardly from the diametrical position of the window WD, that is, from the outer circumferential face of the rotary drum DR, but remain within the range nearer to the center of the rotary drum DR than the diametrical position of the window WD.

Further, at least the dimension of the flat head FH1 in its advancing direction is set a little smaller than the dimension of tie window WD in the same direction. As a result, a pair of channels Ch11 and Ch21 each in the form of an air gap are formed between the opposite side faces SF1 and SF2 of the flat head FH1 and the opposing opposite end faces of the window WD, respectively. Particularly in the present embodiment, the width (length) of the channel Ch11 in the advancing direction and the width (length) of the channel ch21 are set equal to each other.

The flat head FH1 is formed from a magnetic material such as ferrite, Cendust or amorphous alloy and a substrate material of ceramics or the like.

A head element HE1 serving as a recording and/or playback element for magnetically interfering with the magnetic tape MT is disposed at a position on the smooth flat face PL1 of the flat head FH1 on the trailing side with respect to the center in the advancing direction such that it does not project from the smooth flat face PL1. When the rotary drum DR rotates at a drum linear velocity Vd in a predetermined direction, the head element HE1 contacts with a magnetic face not shown of the magnetic tape MT, which is attracted to the smooth flat face PL1, to magnetically record or playback onto or from the magnetic face of the magnetic tape MT through magnetic interference. The head element HE1 is formed as a head gap where the flat head FH1 uses, for example, the principle of magnetic induction.

Meanwhile, the fixed drum DF has a lead Ld formed thereon for controlling the running path of the magnetic tape MT shown in FIG. 1.

The magnetic tape MT is wrapped on the fixed drum DF such that it extends along the lead Ld of the fixed drum DF at a predetermined angle on the cylinders of the rotary drum D; and the fixed drum DF. Further, the magnetic tape MT is acted upon by a tension Ts by a tension control mechanism not shown and is advanced at a magnetic tape linear velocity Vmt by rotation of the rotary drum DR such that it is magnetically recorded/played back in a helical scanning method by the head element HE1 upon rotation of the rotary drum DR.

Since the linear velocity of the outer circumferential face of the rotary drum DR upon rotation of the rotary drum DR is Vd, also the smooth flat face PL1 of the flat head FH1 moves substantially at the linear velocity Vd. The magnetic tape MT advances in the same direction but at the linear velocity Vmt lower than the linear velocity Vd. The difference between the velocities (vector difference) is a substantial velocity of the smooth flat face PL1 with respect to the magnetic tape MT.

It is to be noted that, while the foregoing description relates to the configuration which includes a single rotary drum DR and a single fixed drum DF disposed below the rotary drum DR, the present invention can be applied not only to the configuration just described but also to a magnetic head mechanism of another configuration which includes three or more drums as represented by a magnetic head mechanism of the middle drum rotation type. Further, the feeding direction of the magnetic tape MT may be opposite to a direction in which the linear velocity of the magnetic tape MT on the outer circumferential face of the rotary drum DR is exhibited.

Now, operation of the rotary magnetic head mechanism RHA1 is described with reference to FIGS. 1 to 4.

First, formation of an air film is described.

In a no-load state wherein the magnetic tape MT is not wrapped on the rotary drum DR, when the rotary drum DR rotates, an air layer, that is, an air film, is formed on the outer circumferential face of the rotary drum DR which moves at the linear velocity Vd and also on the face portion of the flat head FH1, that is, the smooth flat face PL1, which moves at the substantially equal linear velocity vd. When the magnetic tape MT is fed, an air film is formed also on the surface of the magnetic tape MT which moves at the linear velocity Vmt. The air films mentioned have a thickness in a normal direction.

The relative velocity of the air nearest to the outer circumferential face of the rotary drum DR with respect to the rotary drum DR is zero. Accordingly, within the air film, a first air layer of a small thickness which contacts with the outer circumferential face of the rotary drum DR moves at a linear velocity equal or close to that of the surface of the rotary drum DR However, a second air layer formed on the first air layer in the same air film cannot keep the linear velocity of the first air layer due to the viscosity of the air and thus moves at a linear velocity lower than that of the first air layer. This signifies that a relative velocity as measured from the outer circumferential face appears. Accordingly, the second air layer is delayed by an amount corresponding to the relative velocity.

Similarly, the absolute value of such a relative velocity as described above successively increases with third and succeeding air layers of a small thickness, and accordingly, he delay mentioned above successively increases. Thus, the absolute value of the relative velocity of an nth air layer of a small thickness in the same air film displaced most from the outer circumferential face of the rotary drum DR exhibits a maximum value, and the air film disappears at a location at which the absolute value of the relative velocity is equal to the absolute value of the linear velocity of the first thin air layer. At the location, the air is environmental air whose linear velocity is zero, that is, stationary air.

Here, the state of the air layers in the air film successively changes from a laminar flow region near to the outer circumferential face of the rotary drum DR in which laminar air flows are formed to an eddy flow region in which eddy flows are formed as the distance from each end face of the rotary drum DR increases.

As described hereinabove, the rotary drum DR moves in an open or released state (no-load state), in which it does not oppose to the magnetic tape MT, over an extent corresponding to one half circumference of rotation thereof while an air film is formed on the outer circumferential face thereof. Then, in the other extent of the succeeding one half circumference of rotation, the rotary drum DR is opposed to the magnetic tape MT wrapped thereon.

Meanwhile, since also the magnetic tape MT moves at the linear velocity Vmt, an air film is formed on the surface of the magnetic tape MT.

Now, operation of the rotary magnetic head mechanism RHA1 where the magnetic tape MT is wrapped on the outer circumferential face of the rotary drum DR rotating at a high speed is described.

The magnetic tape MT which advances at the linear velocity Vmt is acted upon by the tension Ts exerted by a tension arm and so forth not shown provided on the tape take-up side. In a conventional rotary head, the tension is set to a high level to compulsorily press a magnetic tape MT against a head so as to be contacted with the head. However, the rotary magnetic head mechanism RHA1 of the present embodiment applies a suitable tension Ts to the magnetic tape MT without compulsorily pressing the magnetic tape MT against the head so as to be contacted with the head. Consequently, a suitable load is applied to the rotary drum DR.

When the magnetic tape MT is wrapped on the outer circumferential face of the rotary drum DR, fluidic interference appears between them. According to the Bernoulli's theorem (which is a principle of conservation of energy in a broad sense), the sum of the kinetic energy and the pressure of the air is fixed. This is represented as $$P + v^{**}2/2\rho = \text{const}$$

where ** represents the square, and $\rho$ is the specific volume of air. It is to be noted that the potential term is omitted in the expression above.

The air film formed on the outer circumferential face of the rotary drum DR and the air film formed on the surface of the magnetic tape MT are united with each other when the outer circumferential face of the rotary drum DR and the magnetic tape MT are opposed to each other so that a united air film having a new average linear velocity between the linear velocity vd and the linear velocity Vmt is produced between the magnetic tape MT being acted upon by the predetermined tension and the outer circumferential face of the rotary drum DR and is observed as an air stream or air flow which flows along a path defined by and between the outer circumferential face of the rotary drum DR and the magnetic tape MT. The linear velocity of the united air film as measured from the magnetic tape MT is higher than the linear velocity Vmt. However, since the outer circumferential face of the rotary drum DR is finished with surface roughness rougher than that of the head in order to eliminate clinging of the magnetic tape MT and make the magnetic tape MT float from the outer circumferential face of the rotary drum DR, an eddy current state is liable to be caused by the outer circumferential face of the rotary drum DR. Thus, if it is assumed that the united air film is formed from imaginary masses of air, the directions of velocities of the air masses are different from one another and are dispersed, consequently, an increase of the kinetic energy term in the Bernoulli's theorem is suppressed, and also the drop of the pressure term, that is, the compression reduction effect, is decreased when compared with the pressure reduction on the head face which is hereinafter described. As a result, the outer circumferential face of the rotary drum DR can slidably move free from clinging of the magnetic tape MT in a state wherein the magnetic tape MT being acted upon by the predetermined tension floats across the air stream.

Now, operation of the channels Ch11 and Ch21 is described.

The channel Ch11 is provided to control the locus of the magnetic tape MT and operates, for example, in such a manner as described below. It is to be noted that also the channel Ch21 operates substantially similarly.

The channel Ch11 in the form of an air gap between the rotary drum DR and the flat head FH1 is formed such that it extends perpendicularly to the stream line of an air flow produced upon rotation of the rotary drum DR, and operation of the channel Ch11 is described in accordance with operation of a Venturi tube. While the rotary drum DR rotates, since the channel Ch11 moves at a high speed with respect to stationary environmental air, where the environmental air is observed from the inside of the channel Ch11, conversely a high speed flow of the environmental air passes in a substantially rectangular direction on the outer side of an opening of the channel Ch11. Since the channel Ch11 forms a narrow and small path, a negative pressure (ΔP) is produced in accordance with the Venturi effect and reduces the pressure in the channel Ch11. This pressure reduction is caused because the air in the channel Ch11 is sucked out. Here, irrespective of whether the channel Ch11 is configured such that it is closed or open at the bottom thereof or is partly open at an intermediate wall to the bottom thereof, the pressure reduction occurs although the magnitude of it may be different. This arises from the presence of a resistance to and a time delay in energy transmission between air masses, and production of such a local pressure gradient is a phenomenon common to fluids in the form of gas.

The air flow around the channel Ch11 in the form of an air gap which is in a state of high speed rotation is much complicated because of production of eddy currents and so forth even in a steady state. However, if the air flow is grasped in a macroscopic point of view, then it is considered that a flow of the air sucked out as described above forms a flow path along the end face of the channel Ch11 and is sucked out from the channel Ch11 while environmental air is introduced into the channel Ch11 through a central portion of the opening of the channel Ch11 at which the pass resistance is comparatively low and the difference between them forms a steady negative pressure.

The negative pressure to be formed relies principally upon the width of the channel Ch11 if it is assumed that the linear velocity of the air flow which flows past the outside of the opening of the channel Ch11 is fixed. In other words, where the air flow has an equal linear velocity, the absolute value of the negative pressure formed in a channel having a comparatively small width is higher than the absolute value of the negative pressure formed in another channel having a comparatively great width. Accordingly, the width of the channel Ch11 can be designed so that the negative pressure to be produced in accordance with the Bernoulli's theorem may have a predetermined value. This similarly applies also to the channel Ch21.

When the negative pressure is formed in the channel Ch11 or ch21 as described above, the magnetic tape MT passing by the channel Ch11 or Ch21 is attracted to the channel side and the locus thereof is deformed. Accordingly, the locus of she magnetic tape MT can be controlled by the channel Ch11 and Ch21 thereby to control the advancing locus of the magnetic tape MT to the smooth flat face PL1.

Now, fluidic interference and magnetic interference between the smooth flat face PL1 and the magnetic tape MT are described An air film is formed on the smooth flat face PL1 of the flat head FH1 which moves at a velocity near to the linear velocity Vd and another air film is formed on the surface of the magnetic tape MT which moves at the linear velocity Vmt. The air films are united with each other when the smooth flat face PL1 and the magnetic tape MT approach and are opposed to each other. The resulting film is observed as an air stream which flows along a narrow flow path formed between the smooth flat face PL1 and the magnetic tape MT. Further, since the smooth flat face PL1 is formed, for example, by mirror surface finish so that it may have a low surface roughness. Therefore, the linear velocity of the air stream as measured from the magnetic tape MT is sufficiently higher than the linear velocity Vmt, resulting in increase of the kinetic energy term of the Bernoulli's theorem while reducing the pressure term, that is, increasing the pressure reduction effect.

Figure 4:
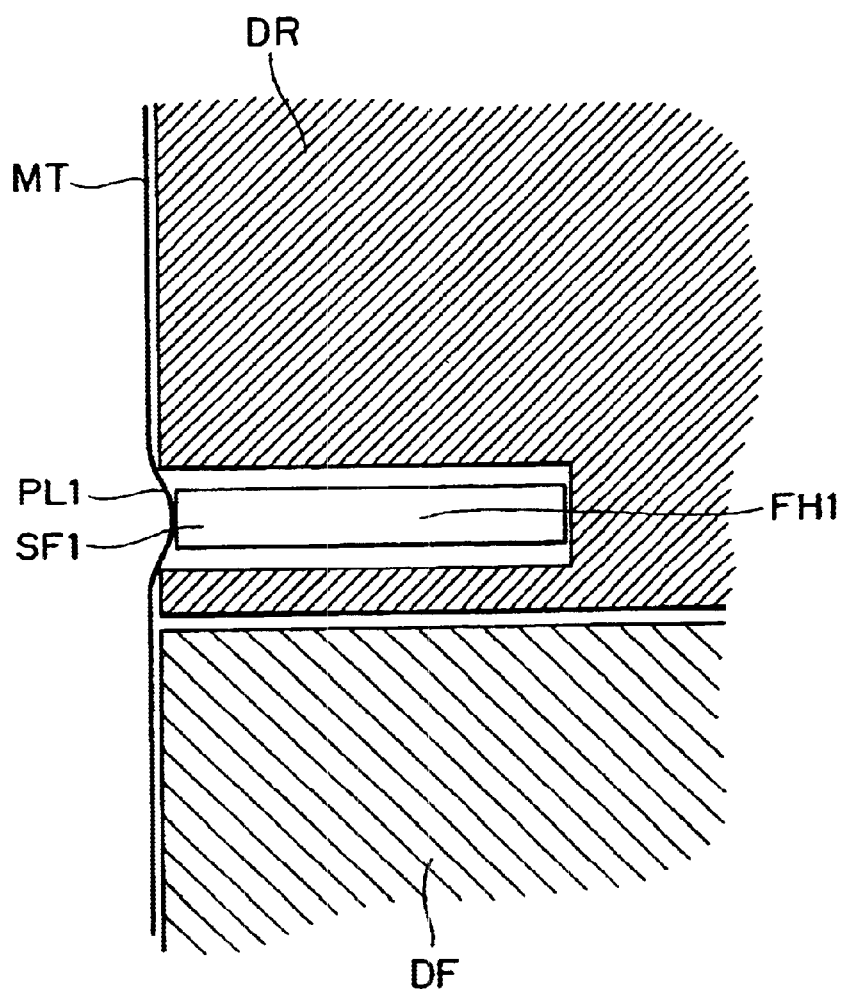
FIG. 4 is a view as viewed in the direction indicated by another arrow mark B in FIG. 2.

As a result, the smooth flat face PL1 effectively attracts the magnetic tape MT to achieve an effective contact state as seen in FIG. 4. Here, since the magnetic face (not shown) of the magnetic tape MT which is opposed to and contacts with the smooth flat face PL1 is formed more roughly than the surface roughness of the smooth flat face PL1 in order to prevent clinging to the smooth flat face PL1, even though the magnetic tape MT contacts with the smooth flat face PL1, it does not cling to the smooth flat face PL1.

By a strong action of the Bernoulli's effect because of the smooth (the surface roughness is low) and flat configuration of the smooth flat face PL1 as described above, the approaching magnetic tape MT further approaches along the smooth flat face PL1 and partly breaks the air stream until it is contacted with the smooth flat face PL1. The contact pressure in this instance is based on a fluid mechanical action caused by an air flow produced automatically upon rotation of the rotary drum DR as described above and therefore is characterized in that there is no need of applying compulsory force for the contact.

Where the contact state is established in this manner, magnetic interference free from abrasion of the magnetic tape MT by the head element HE1, that is, magnetic recording/playback, is executed stably.

Figure 5:
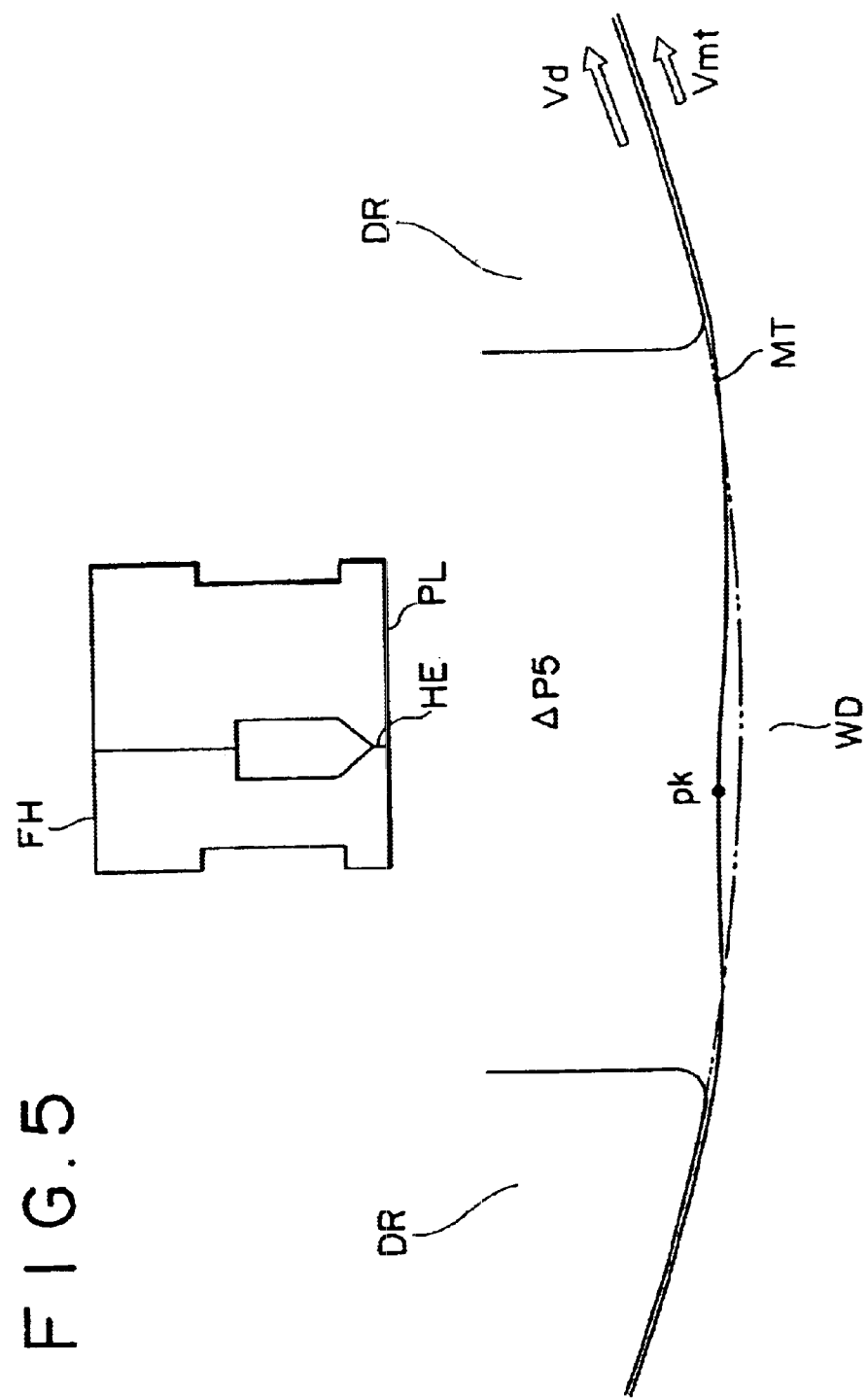
FIGS. 5 and 6 are schematic views illustrating different stages of an experiment performed before the configuration of the rotary magnetic head mechanism of FIG. 1 is reached.
Figure 6:
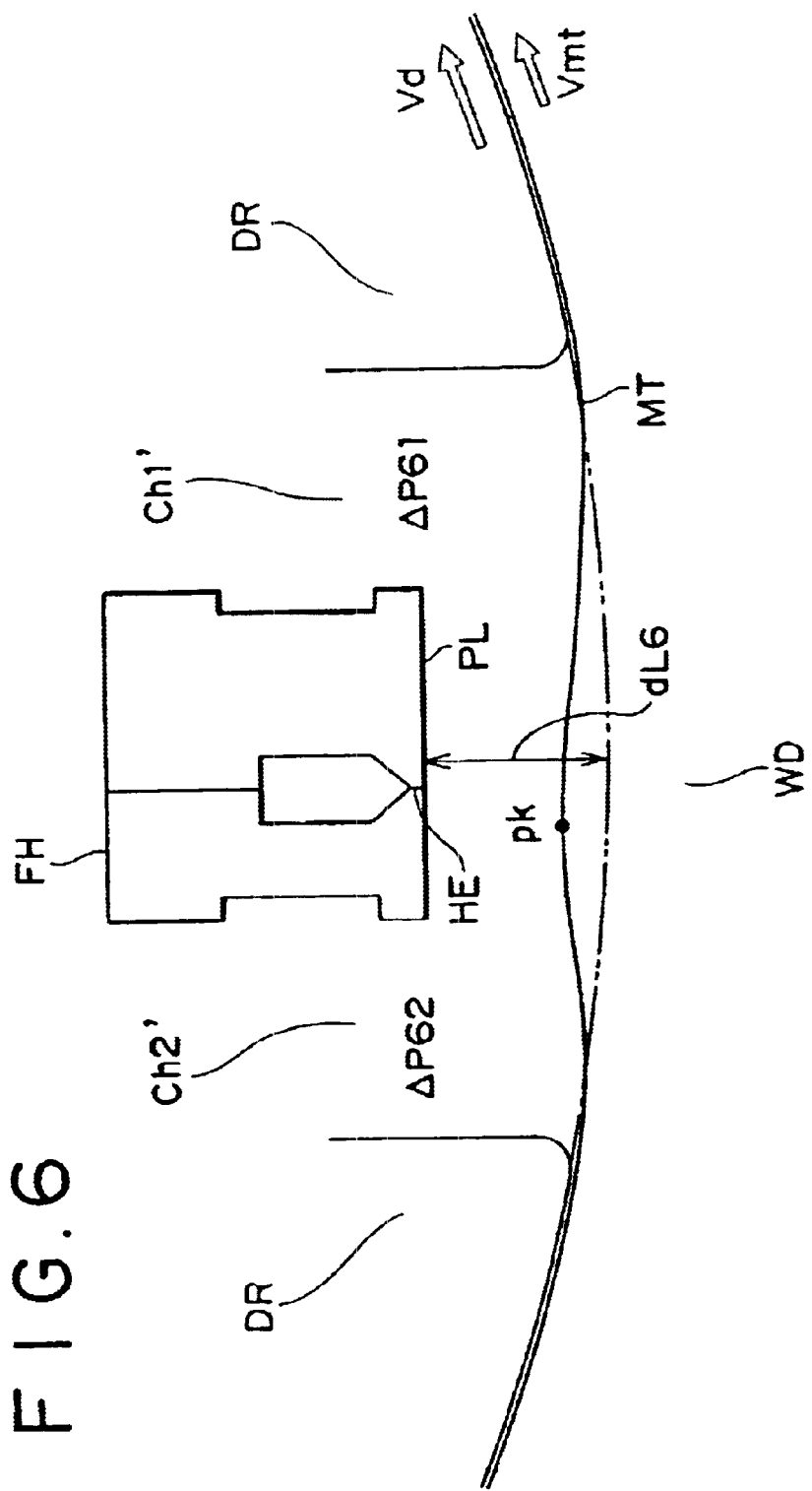
Figure 7:
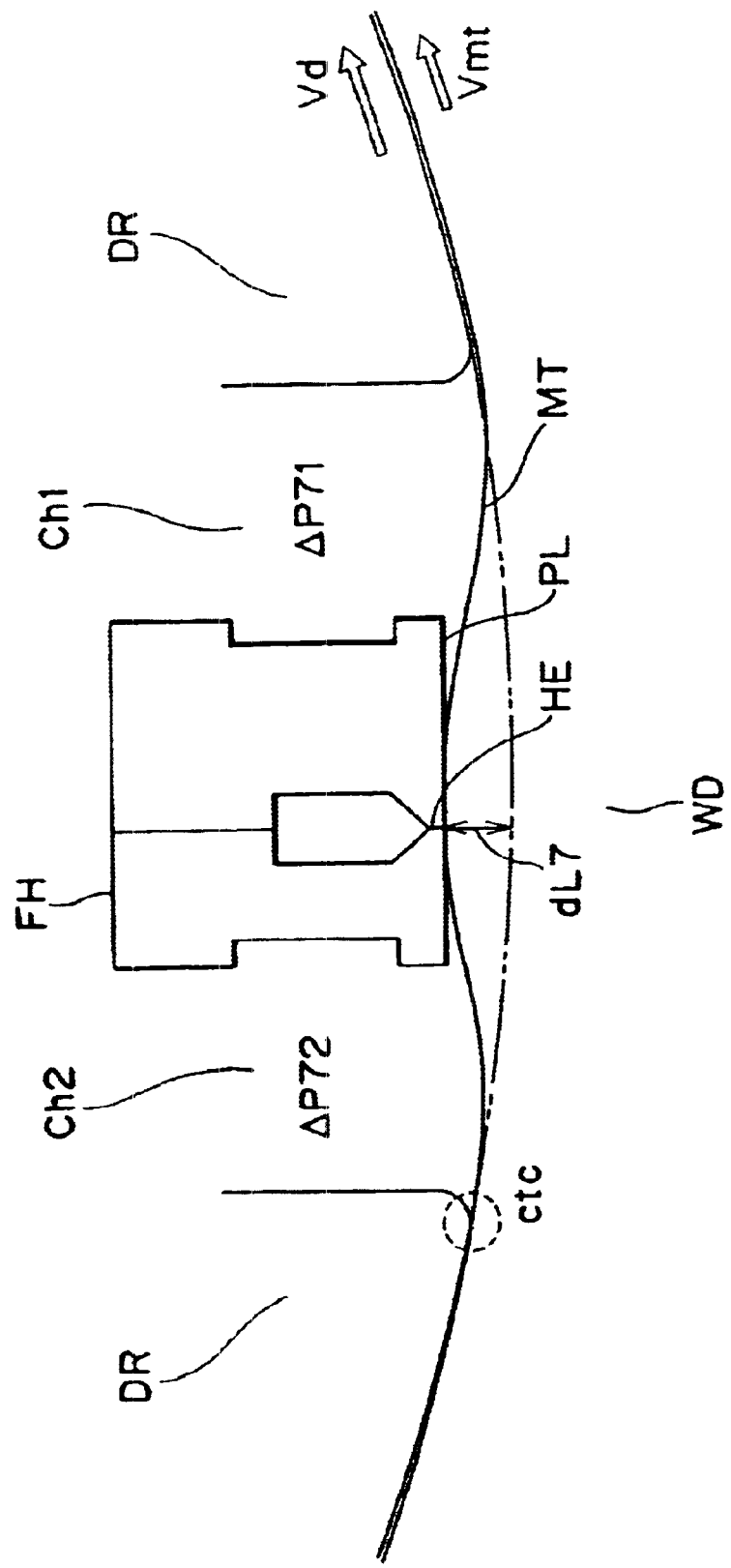
FIG. 7 is a schematic view illustrating a configuration and a principle of the magnetic head shown in FIG. 1 in more detail.

FIGS. 5 and 6 illustrate different stages of an experiment conducted until the configuration of the embodiment described above is reached. FIG. 7 illustrates the configuration and the principle of the present embodiment in more detail. In the following, a process until the configuration of the present embodiment and the configuration of the present embodiment are described with reference to FIGS. 5 to 7.

FIG. 5 illustrates a result of an experiment conducted while the flat head FH disposed in the window WD of the rotary drum DR is positioned at such a retracted interior position that it cannot fluidically with the magnetic tape MT. In the configuration shown in FIG. 5, the entire window WD acted as a single channel or recess of a great width. Since the window WD had a great width, the negative pressure ΔP5 by the window WD was low as described hereinabove, and consequently, it was observed that the distortion of the attraction locus of the magnetic tape MT when the magnetic tape MT passes by the window WD was small. At this time, it was observed that, due to the rigidity and the inertia of the magnetic tape MT, the peak pk of the distortion of the attraction locus appears not at a central portion of the window WD but at a portion on the trailing side with respect to a central portion of the window WD in the advancing direction.

Then, the flat head FH whose center was placed at the center of the window WD was moved toward the outer circumferential side to a position at which the distance dL6 between the smooth flat face PL and an imaginary outer circumferential face of the rotary drum DR was a little smaller, that is, the depth from the outer circumferential edge of the window WD to the smooth flat face PL was reduced a little and besides the flat head FH was not fluidically inteferable with the magnetic tape MT as seen in FIG. 6. In this instance, the inside of the window WD is partitioned into two channels Ch1' and Ch2' of a substantially equal width by the flat head FH1. It is to be noted that, since the channels Ch1' and Ch2' are in a state intermediate to the full-scale channels Ch1 and Ch2, the pressure reductions (negative pressures) ΔP61 and ΔP62 were still insufficient and a sufficient attraction effect of the locus of the magnetic tape MT was not obtained. However, an increased attraction effect when compared with that for the attraction locus described hereinabove with reference to FIG. 5 was observed. It was further observed that the peak pk of the distortion of the attraction locus was formed on the trailing side with respect to the central portion of the window WD in the advancing direction similarly as described hereinabove.

Meanwhile, it was observed that, although an air film was formed on the smooth flat face PL, it did not exert a sucking effect as yet because it was far from the magnetic tape MT.

Thereafter, the position of the flat head FH was further moved to the outer circumferential side of the rotary drum DR to further decrease the distance dL7 between the smooth flat face PL and the imaginary circumferential face, that is, to further reduce the interior distance from the outer circumferential edge of the window WD to the smooth flat face PL as seen in FIG. 7. Consequently, the full-scale channels Ch1 and Ch2 were formed and the pressure reductions (negative pressures) ΔP71 and ΔP72 were increased. Consequently, a sufficient attraction effect of the locus of the magnetic tape MT was obtained. Then, an air film on the smooth flat face PL attracted without fail the magnetic tape MT together with another air film formed on the surface of the magnetic tape MT, that is, an air film on the surface of the magnetic tape MT moving at the linear velocity Vmt, to form a united air stream which flowed along a narrow flow path formed between the magnetic tape MT and the smooth flat face PL. Thus, it was confirmed that the magnetic tape MT was contacted with the smooth flat face PL by pressure reduction caused by the united air stream in accordance with the Bernoulli's theorem.

In the manner, according to the configuration shown in FIG. 7, the contact of the magnetic tape MT with the smooth flat face PL is realized in two stages. In particular, in the first stage, the magnetic tape MT is attracted toward the smooth flat face PL at the rather interior or retracted position by a negative pressure effect of a channel, and then in the second stage, an air film formed on the smooth flat face PL attracts the magnetic tape MT having been attracted toward the smooth flat face PL to contact the magnetic tape MT with the smooth flat face PL. In this instance, since the magnetic tape MT can approach the smooth flat face PL sufficiently by the attraction in the first stage, the flow path for air between the smooth flat face PL and the magnetic tape MT is narrowed, and then in the second stage, the pressure reduction effect of the air film flowing in the narrowed flow path acts further effectively to realize the contact in a short lead distance. The configuration is characterized in that a synergetic effect of the effect of the first stage and the effect of the second stage is realized.

The advantage described above will be apparent, for example, if the short lead distance is compared with a long distance until contact of a magnetic tape is obtained with a conventional configuration that a rotary drum does not have a channel having an attracting action and a smooth flat face is provided not at a rather interior position but on an outer circumferential face of the rotary drum.

The magnetic tape MT contacts with the smooth flat face PL over a contact range which depends upon various forces acting upon the magnetic tape MT, and while the magnetic tape MT remains in contact with the smooth flat face PL, the magnetic tape MT contacts and magnetically interferes with the head element HE to effect recording/playback. Although it is shown in FIG. 7 that the head element HE1 is provided on the trailing side with respect to the center of the smooth flat face PL1 similarly as in FIGS. 1 to 3, it is only required that the head element HE be disposed within such a contact range of the magnetic tape MT as described above, and this provides flexible adaptability to various operation conditions. Further, only if the head element HE is positioned within the contact range, it may be disposed otherwise, for example, at a substantially central position of the smooth flat face PL.

Since the synergetic effect of the effect of the first stage and the effect of the second stage by air flows produced naturally by the structure of the present embodiment is realized only by rotating the rotary drum DR as described above, the head contact pressure can be reduced to a very low level. Accordingly, abrasion of the head element HE is very little, and consequently, where a head of a magnetic induction type, that is, a head of a configuration which has a head gap, is applied as the head element HE, the gap depth can be reduced to as small as approximately several $\mu$m. Consequently, such a deep margin as that of the conventional configuration need not be presupposed, and therefore, recording/playback in the best conditions can be anticipated from the initial stage of use of the head and recording/playback of a high recording density can be anticipated. Further, the head itself can be formed in a reduced size and have a long life.

Furthermore, since the head contact pressure is very low, also increase of the life of a magnetic tape can be anticipated simultaneously.

At the trailing end of the contact range of the magnetic tape MT with the smooth flat face PL, the balance between the tension applied to the magnetic tape MT and the pressure reduction by an air film whose energy has been attenuated is lost. Therefore, the magnetic tape MT is spaced away from the smooth flat face PL and passes by the channel Ch2 and then comes to the outer circumferential face of the rotary drum DR past the trailing edge of the window WD, whereafter it further advances rearwardly in the advancing direction on the air film on the outer circumferential face of the rotary drum DR.

Since the peak pk of the deformation of the attraction locus is formed on the trailing side in the advancing direction and consequently the contact range of the magnetic tape MT on the smooth flat face PL is displaced to the trailing side with respect to the center of the smooth flat face PL, where the position at which the balance between the pressure reduction by the air film and the tension described above is lost is displaced to the trailing side, for example, if the magnetic tape MT has a thick tape base, then the magnetic tape MT may possibly be brought into contact in a colliding fashion (denoted by etc. in FIG. 7) with the trailing edge of the channel Ch2, that is, the trailing edge of the window WD. Therefore, where a magnetic tape of an ordinary type whose magnetic face itself is not particularly superior in impact resistance and abrasion resistance or whose bonding agent for adhesion of a magnetic face to the tape base is not particularly superior in property is used for the magnetic tape MT, preferably a countermeasure for preventing the magnetic tape MT from being acted upon by an impact is taken.

Figure 3:
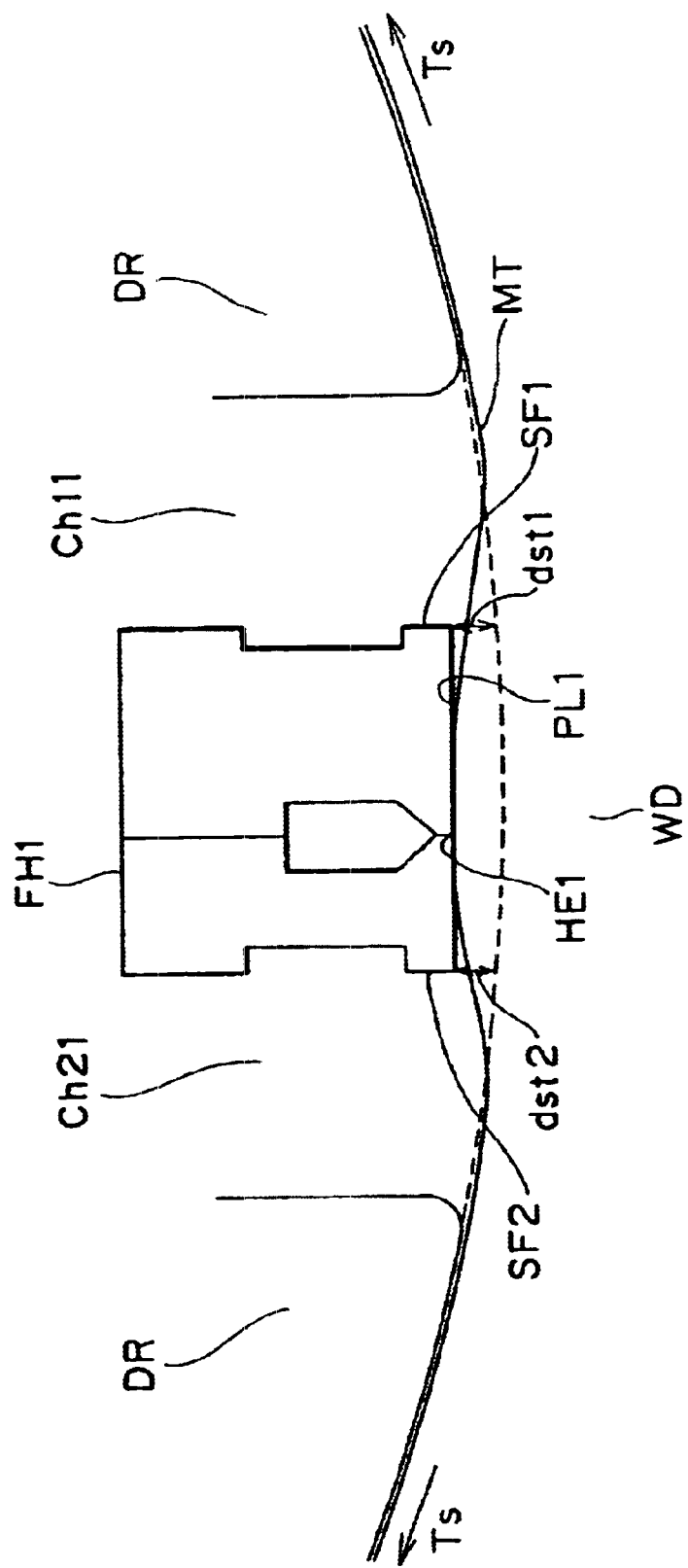
FIG. 3 is a view as viewed in the direction indicated by an arrow mark A in FIG. 2.

In order to eliminate such an impact upon the magnetic tape MT as just described, the trailing edge of the window WD may be formed, for example, as an edge having a curvature as seen in FIG. 3. Where the edge has a curvature in this manner, even if an impact occurs, the magnetic tape MT can be protected from the impact.

Another countermeasure is described in connection with another embodiment of the present invention.

Figure 8:
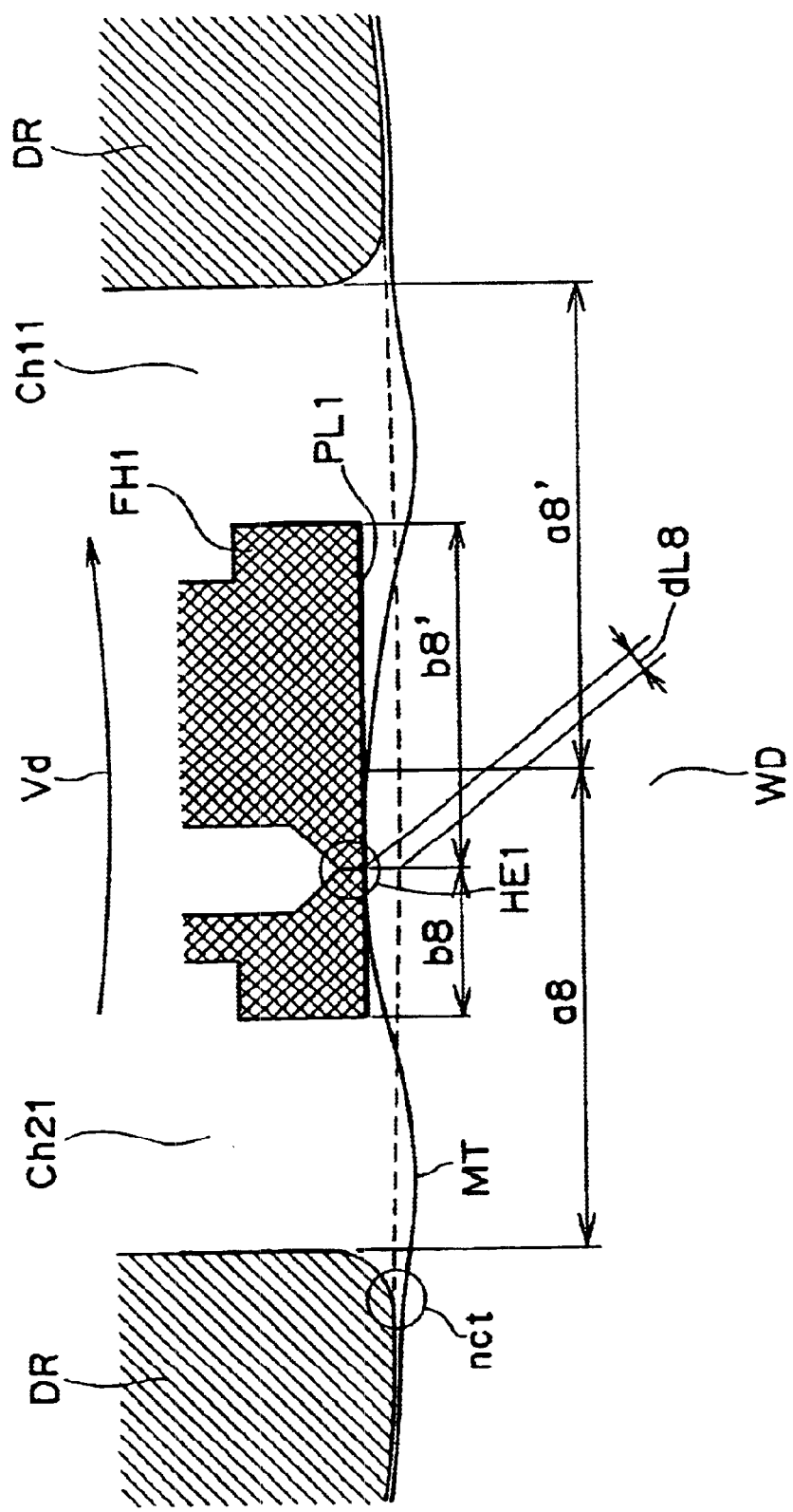
FIG. 8 is a schematic view showing another rotary magnetic head mechanism to which the present invention is applied.

FIG. 8 shows another rotary magnetic head mechanism to which the present invention is applied.

Referring to FIG. 8, the rotary magnetic head mechanism shown includes a rotary drum DR having a cylindrical outer circumferential face and having a window WD open on the outer circumferential face. A flat head FH1 of a size smaller than the window WD is disposed at the center in the window WD. The width of the flat head FH1 (sum of the dimensions indicated by reference characters b8 and b8') is smaller than the width of the window WD (sum of the dimensions indicated by reference characters a8 and a8'). The dimension a8 is the distance between the trailing end of the window WD and the center of the flat head FH1, and the dimension a8' is the distance between the leading end of the window WD and the center of the flat head FH1. Therefore, a pair of channels ch11 and Ch21 of an equal width each in the form of an air gap are formed between the leading and trailing ends of the flat head FH1 and the leading and trailing ends of the window WD, respectively.

The outer circumferential face of the rotary drum DR is rotated at a predetermined linear velocity Vd in a tangential direction with a magnetic tape MT partially wrapped thereon, and also the flat head FH1 advances in a predetermined advancing direction by the rotation of the outer circumferential face of the rotary drum DR. The flat head FH1 has a smooth flat face PL1 which is moved by rotation of the rotary drum DR and opposed to the magnetic tape MT to fluidically interfere with the magnetic tape MT, and a head element HE1 disposed on the trailing side in the advancing direction with respect to the center on the smooth flat face PL1 and functioning as a recording and/or playback element such that it contacts with the magnetic tape MT to magnetically interfere with the magnetic tape MT to execute at least one of recording and playback.

The head element HE1 is configured such that the length b8' thereof from the leading end thereof in the advancing direction is greater than the length b8 thereof to the trailing end in the advancing direction (b8<b8'). Accordingly, the head element HE1 is positioned on the rear side with respect to the center on the smooth flat face PL1

The smooth flat face PL1 extends perpendicularly to a diametrical direction of the rotary drum DR and is disposed at a position dL8 which is rather retracted from the outer circumferential face of the rotary drum DR and at which the magnetic tape MT spaced away from the smooth flat face PL1 after contact thereof with the smooth flat face PL1 can pass by the trailing edge of the window WD without colliding or contacting with the trailing edge. Since the smooth flat face PL1 is disposed in a displaced relationship in this manner, the position dL8 indicating the depth of the smooth flat face PL1 is shallower than the position dL7 in the preceding embodiment.

Operation of the rotary magnetic head mechanism of the present embodiment is described. Since the magnetic tape MT is displaced to the outer circumference side by the smooth flat face PL1, the magnetic tape MT can pass over the trailing end of the channel Ch21, that is, the trailing edge of the window WD, without contacting with the latter (denoted by nct in FIG. 8). Other operation of the magnetic tape MT is substantially similar to that in the preceding embodiment described above, and therefore, overlapping description of the same is omitted herein to avoid redundancy.

Figure 9:
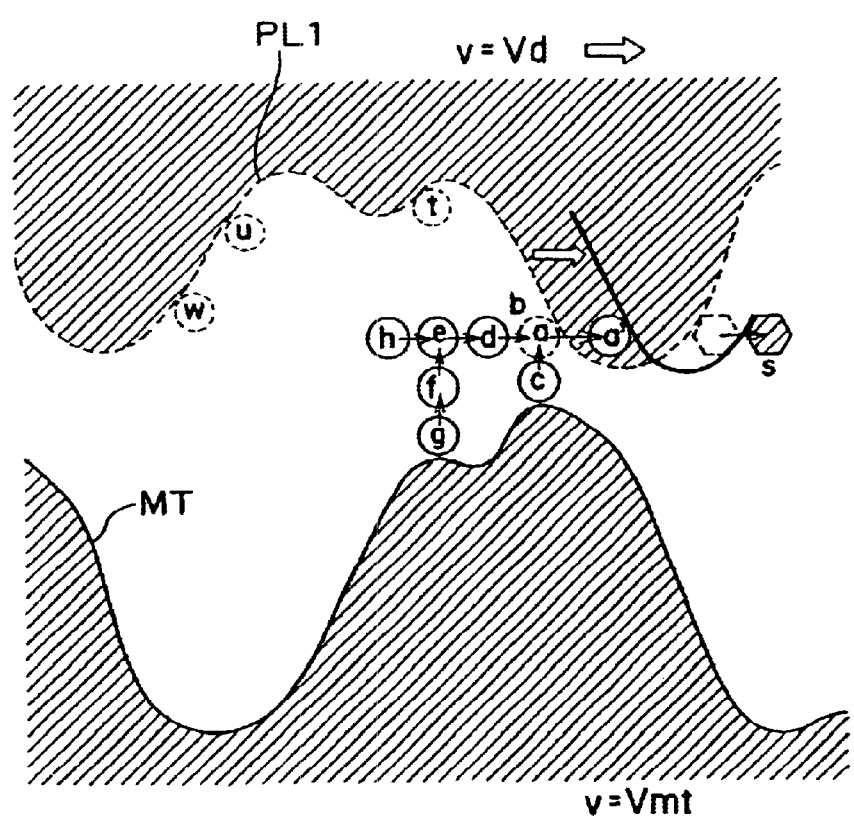
FIG. 9 is a diagrammatic view illustrating fluidic interference between a smooth flat face of a magnetic head shown in FIG. 8 and a magnetic tape.

FIG. 9 illustrates fluidic interference between the smooth flat face of the head and the magnetic tape in the rotary magnetic head mechanism of the present embodiment and particularly illustrates attraction and contact of the magnetic tape MT by the smooth flat face PL1 of the flat head FH1 microscopically.

Air which occupies a very small volume in the air which is present on the smooth flat face PL1 is regarded as an imaginary mass, and such air masses as those denoted by reference characters a, d, e, f, h and s to w are presumed as seen in FIG. 9. Also such air masses as those denoted by reference characters c and g in the air which is present on the magnetic tape MT are presumed.

Transmission of force between adjacent air masses, for example, between the air masses d and e is acted upon by resistance and involves some delay in time. This characteristic is explained as viscosity or viscous resistance of the air.

Inter-molecular attractive force acts between the surface of the smooth flat face PL1 of the flat head FH1 and air masses which contact with the surface of the flat head FH1 (such as the air masses a, s, t, u and w in FIG. 9) to attract the air masses to the surface of the smooth flat face PL1.

As the smooth flat face PL1 moves, also the air mass a attracted to the surface of the smooth flat face PL1 moves together, and when the air mass a comes to a position indicated by a' in FIG. 9, an imaginary air gap b of a reduced pressure is produced at the original position of the air mass a. The air gap b is filled up because it takes in the adjacent air mass d therearound. Consequently, a next air gap of a reduced pressure is produced at the position at which the attracted air mass d has been formerly, and attracts the adjacent air mass e therearound. Then, the air mass e sucks part of the adjacent air mass f and part of the adjacent air mass h.

While generation of an air gap is successively propagated in this manner, the reduced pressure state of the air gap gradually approaches the environmental pressure due to the loss of energy, for example oscillation of the air masses or temperature rise, which occurs upon such propagation, and finally, generation of an air gap comes to ah end soon. The viscous resistance given hereinabove is another explanation of such an energy transmission efficiency as just described.

An air film is formed on the surface of the moving smooth flat face PL1 in such a manner as described above. It is recognized that the air film moves with a velocity in the advancing direction of the smooth flat face PL1 and has a velocity gradient based on the energy transmission efficiency in the direction of the height perpendicular to the advancing direction such that, as the height (thickness) increases, the velocity decreases and, at a certain height (limit thickness of the air film), the air film loses its velocity and disappears.

In the rotary magnetic head mechanism of the present embodiment, while the smooth flat face PL1 is configured such that an average tangential direction thereof coincides with the head advancing direction, since very small concave and convex portions are present on the surface of the smooth flat face PL1 because of a limit to working of the surface, the air mass a adjacent which a wall of the surface is present in the advancing direction gives rise to formation of the air gap b as the surface moves. On the other hand, the air masses s, t, u and w adjacent which a wall of the surface is present on the trailing side in the advancing direction are pushed by and move together with the wall of the smooth flat face PL1 present on the back thereof. Therefore, the air masses s, t, u and w do not give rise to formation of an air gap. Accordingly, not all of air masses on the surface of the smooth flat face PL1 which has some concave and convex portions contribute to formation of an air film.

On the other hand, inter-molecular force acts between the surface of the magnetic tape MT and air masses adjacent the surface of the magnetic tape MT such as the air masses c and g in FIG. 9 so that the air masses are attracted to the surface of the magnetic tape MT, and consequently, an air film is formed on the surface of the magnetic tape MT as the magnetic tape MT moves.

A phenomenon which appears when the magnetic tape MT approaches the surface of the smooth flat face PL1 in the foregoing description is explained in the following manner.

The magnetic tape MT is opposed on the magnetic substance side thereof to the smooth flat face PL1 of the head, and since the magnetic substance is intentionally formed as a rough face in order to prevent otherwise possible clinging of the magnetic tape MT to the smooth flat face PL1 of the head, it has very small concave and convex portions and such air masses as the air masses c and g are attracted to the magnetic substance by intermolecular attractive force. If, for example, the air mass c from among such air masses is taken into the air gap b of a reduced pressure state produced in such a manner as described above on the moving head side, the magnetic substance of the magnetic tape MT is attracted to the smooth flat face PL1 of the head. In this manner, the air gap b takes in part of the air mass d of the air film on the smooth flat face PL1 side and part of the air mass c of the air film on the magnetic tape MT side.

Similarly, an air gap produced by the air mass f of the air film on the smooth flat face PL1 side takes in the air mass g of the air film on the magnetic tape MT side thereby to attract the magnetic substance of the magnetic tape MT to the smooth flat face PL1 of the head.

Such phenomena appear at different opposing portions of the smooth flat face PL1 and the magnetic tape MT, and consequently, the magnetic tape MT is attracted generally to the smooth flat face PL1 of the head and concave and convex portions of the smooth flat face PL1 and the magnetic tape MT are partially contacted with each other. Such fluidic interference as described above is macroscopically explained as an effect by pressure reduction in accordance with the Bernoulli's theorem. Further, by the partial contact between the concave and convex portions of the smooth flat face PL1 and the magnetic tape MT, an average distance between the flat head FH1 and the magnetic tape MT is maintained, which allows magnetic interference between them to perform recording/playback.

Further, in the present embodiment, a magnetic induction type head is applied to the flat head FH1 as can be seen apparently from FIG. 8, and accordingly, the head element HE1 is formed as a head gap. Thus, since the location of the head gap is displaced to the trailing side, the head element HE1 can magnetically interfere with the magnetic tape MT stably.

Further, the contact pressure to the head element HE1 is described. Since the present embodiment utilizes the contact of the magnetic tape MT with the smooth flat face PL1 of the flat head FH1 caused by a pressure reduction effect in accordance with the Bernoulli's theorem, the contact pressure to the head element HE1 can be controlled to a sufficiently low level, and besides a contact pressure which has no problem in terms of the magnetic induction effect can be obtained stably. Accordingly, since it is not necessary, for example, to apply high tension to the magnetic tape to compulsorily press the magnetic tape to contact with the head as in the conventional configuration, the head is abraded but very little and any problem arising from abrasion of the head can be eliminated, resulting in achievement of an increased life of the head. Furthermore, since the load to the magnetic tape MT is low, abrasion and/or nonreversible deformation of the magnetic tape MT can be prevented, thereby achieving an increased life of the magnetic tape MT simultaneously.

Further, since abrasion of the head is little, the gap depth of the head element HE1 can be formed shallow, for example, approximately several microns or less. Consequently, the head performance can be improved to allow high density recording/playback with a high sensitivity.

Further, since the abrasion of the head is little as described above, even to a configuration wherein a magnetic tape and a head contact with each other, an MR head, a Gmr head or the like of the magneto-resistance effect type (or magnetic flux response type) which makes use of a magneto-resistance effect to detect a variation of the magnetic field on a recording medium with a very shallow gap depth can be applied.

Figure 10:
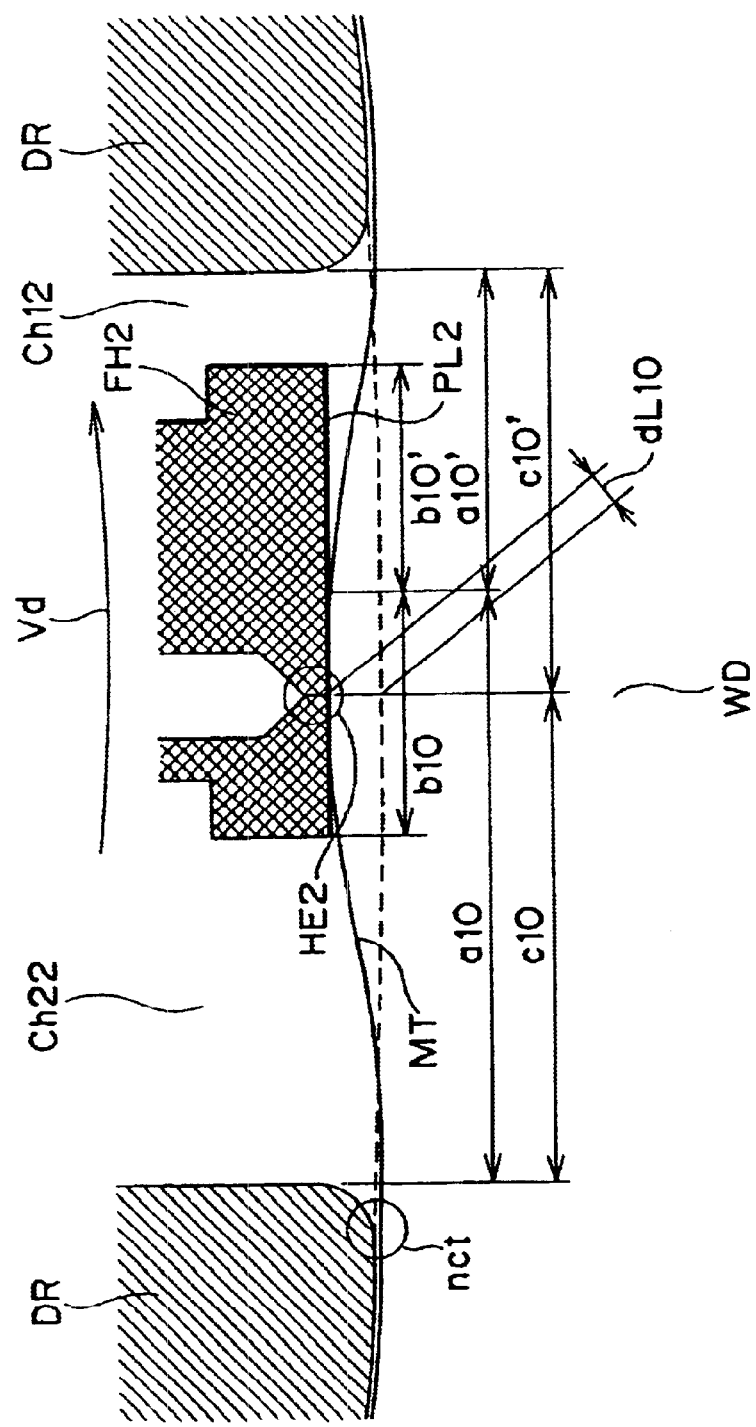
FIG. 10 is a schematic view showing a further rotary magnetic head mechanism to which the present invention is applied.
Figure 11:
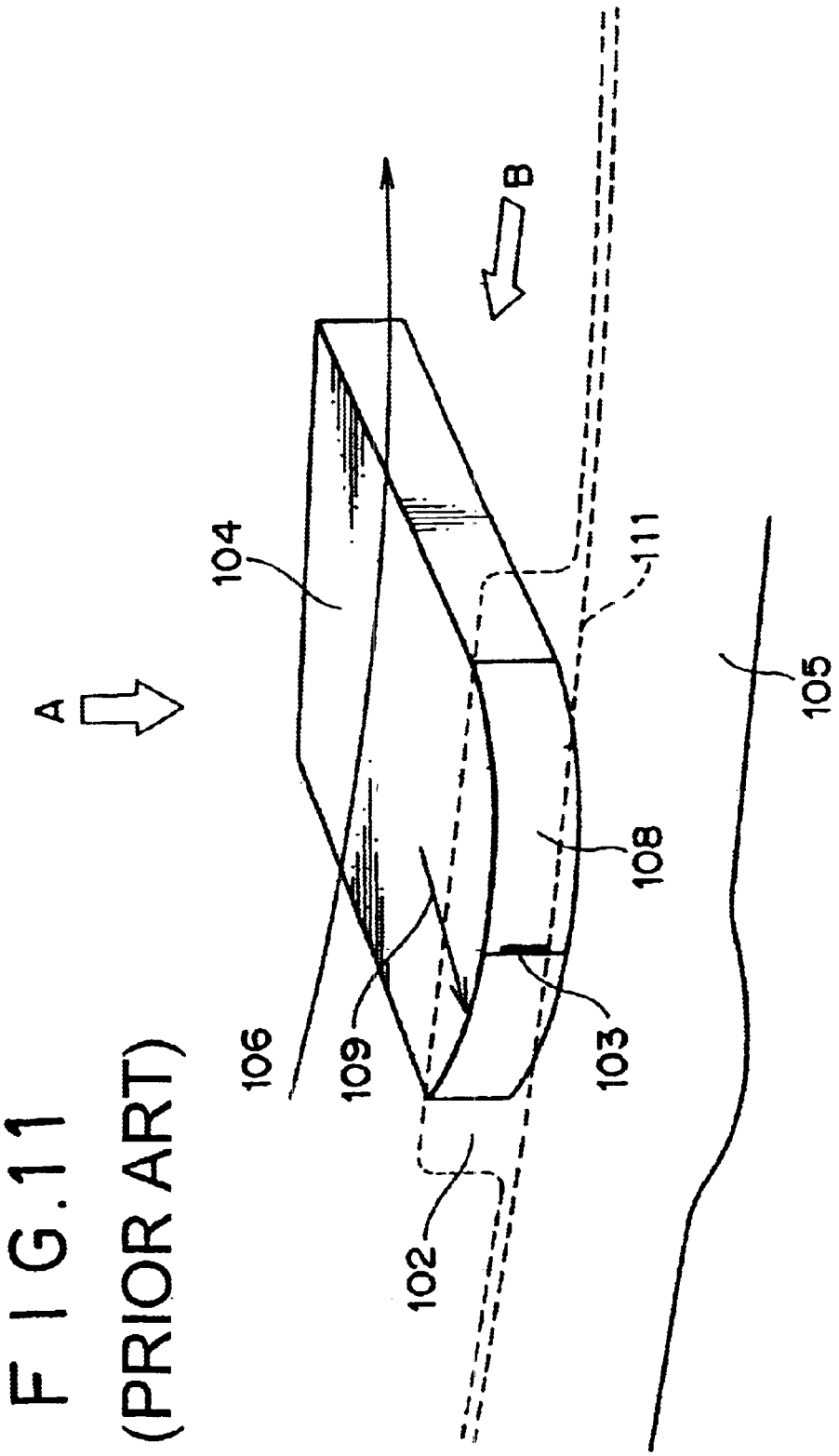
FIG. 11 is a schematic perspective view showing a configuration of a conventional rotary drum type head.
Figure 12:
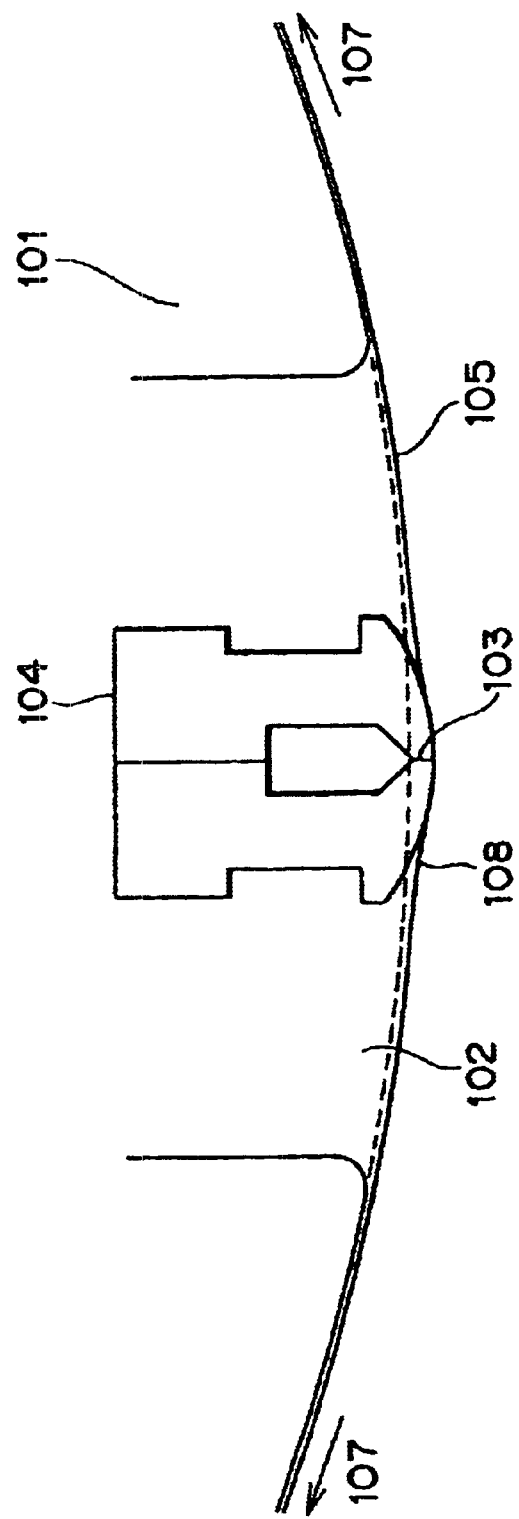
FIG. 12 is a view as viewed in the direction indicated by an arrow mark A in FIG. 11.
Figure 13:
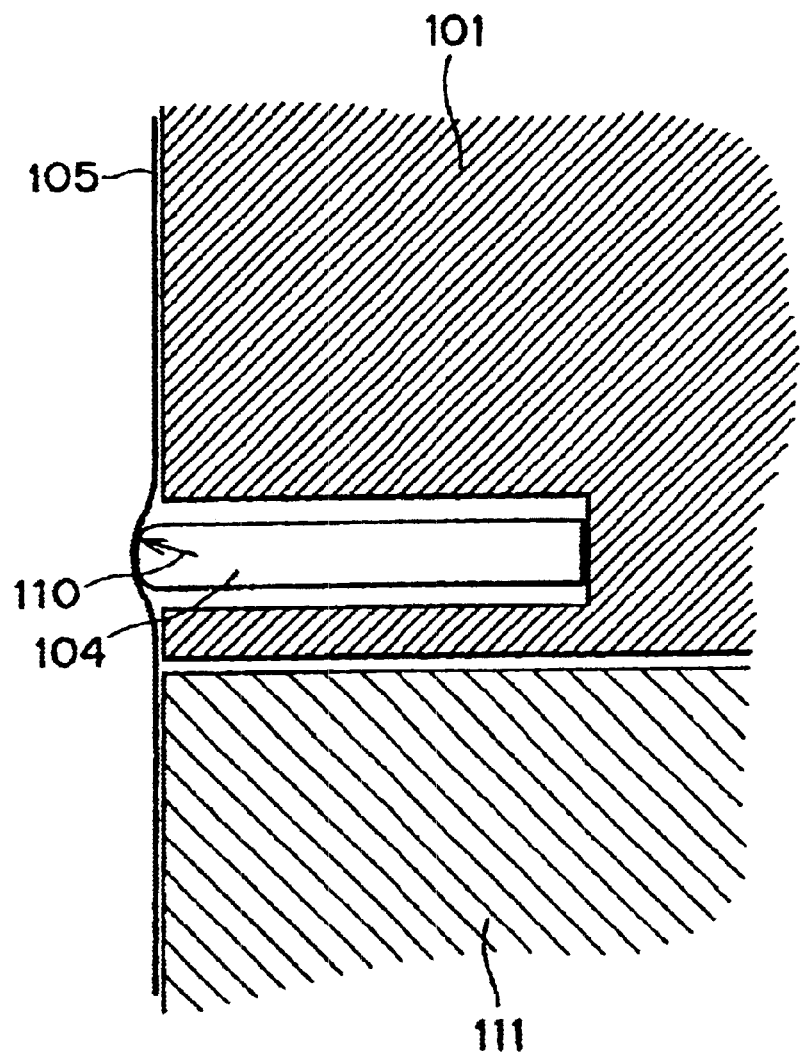
FIG. 13 is a view as viewed in the direction indicated by another arrow mark B in FIG. 11.

FIG. 10 shows a configuration of a further rotary magnetic head mechanism to which the present invention is applied.

Referring to FIG. 10, the rotary magnetic head mechanism according to the present embodiment includes a rotary drum DR having a cylindrical outer circumferential face. A window WD is open to the outer circumferential face of the rotary drum DR, and a flat head FH2 of a dimension smaller than the window WD is disposed in the window WD. Th width of the flat head FH2 (sum of the dimensions denoted by b10 and b10') is smaller than the width of the window WD (sum of the dimensions denoted by a10 and a10') The dimension a10' is the distance between the trailing end of the window WD and the center of the flat head FH2, and the dimension a10' is the distance between the leading end of the window WD and the center of the flat head FH2. Since a10'<a10, the flat head FH2 is disposed at a position displaced in the advancing direction in the window WD. As a result, a channel Ch12 of a small width is formed between the leading end of the window WD and the leading end of the flat head FH2 while a channel ch22 of a great width is formed between the trailing end of the flat head FH2 and the trailing end of the window WD.

The outer cylindrical face of the rotary drum DR rotates at a predetermined linear velocity vd in a tangential direction with a magnetic tape MT wrapped partially thereon, and as the outer circumferential face rotates, also the flat head FH2 advances in a predetermined advancing direction. The flat head FH2 has a smooth flat face PL2 which is moved by the rotation of the rotary drum DR and opposed to the magnetic tape MT to fluidically interfere with the magnetic tape MT, and a head element HE2 disposed on the trailing side of the advancing direction with respect to the center of the smooth flat face PL2 and functioning as a recording and/or playback element such that it contacts with and magnetically interferes with the magnetic tape MT to perform at least one of recording and playback.

A tangential line at least at one position of the face of the smooth flat face PL2 with which the magnetic tape MT contacts extends perpendicularly to a diametrical direction of the rotary drum DR, and the smooth flat face PL2 is disposed at a position dL10 rather retracted from the outer circumferential face of the rotary drum DR such that the entire smooth flat face PL2 is present on the inner circumference side with respect to the outer circumferential face of the rotary drum DR.

Further, the head element HE2 is positioned at a central portion of the window WD at which the distance c10' from the leading end of the window WD and the distance c10 to the trailing end of the window WD are equal to each other. Accordingly, the head element HE2 is positioned on the trailing side with respect to the center of the smooth flat face PL2.

Operation of the rotary magnetic head mechanism of the present embodiment is described.

When the rotary drum DR rotates, the pressure reduction in the channel ch21 of a smaller width on the leading side of the window WD is greater than the pressure reduction in the channel ch22 of a greater width on the trailing side. Consequently, the peak of the attraction locus of the magnetic tape MT which is attracted toward the smooth flat face PL2 positioned on the inner circumferential side of the rotary drum DR is not displaced to the trailing side with respect to the center by the inertia as in the conventional configuration, but is formed at a position displaced backwardly to the leading side.

On the other hand, since the smooth flat face PL2 extends perpendicularly to a radial direction of the rotary drum DR, the smooth flat face PL2 advances in a tangential direction to the face of the rotary drum DR when the rotary drum DR rotates. Consequently, an air flow is formed in a tangential direction on the smooth flat face PL2

The air flow flows along a narrow path between the magnetic tape MT, which has approached the smooth flat face PL2 by an attraction effect by the channel described above, and the smooth flat face PL2, and pressure reduction occurs in accordance with the Bernoulli's theorem. By the pressure reduction effect, the magnetic tape MT gradually approaches the smooth flat face PL2 and contacts with the smooth flat face PL2 principally on the leading side with respect to the center in accordance with the displacement of the peak to the leading side described above. Consequently, the magnetic tape MT is brought into contact under a contact pressure with the head element HE2 disposed on the smooth flat face PL2. In this manner, the magnetic tape MT can be contacted with the head element HE2 with a predetermined low contact pressure by a pressure reduction effect of an air flow generated naturally when the smooth flat face PL2 advances without applying a compulsory force for such contact of the magnetic tape MT. Consequently, recording/playback can be anticipated while suppressing abrasion of the head element HE2 and abrasion of the magnetic tape MT.

Further, since the peak of the locus of the magnetic tape MT is displaced back to the leading side on the smooth flat face PL2 as described above, the position at which the magnetic tape MT is spaced away from the smooth flat face PL2 after it contacts with the latter is displaced to the leading side. In addition, due to the small pressure reduction in the channel Ch22 of a greater width on the trailing side, the attraction of the magnetic tape MT passing by the channel Ch22 is decreased. Consequently, the magnetic tape MT can pass over the trailing edge of the window WD without colliding or contacting with the trailing edge (denoted by reference character nct in FIG. 10).

In this manner, with the rotary magnetic head mechanism of the present embodiment, by the adjustment of the widths of the channel Ch21 and the channel Ch22 in the advancing direction, the locus of the magnetic tape MT can be controlled to optimally set the contact range and the contact position of the magnetic tape MT with the smooth flat face PL2 and the head element HE2, and besides collision or contact of the magnetic tape MT with the trailing edge of the window WD can be prevented. The rotary magnetic head mechanism further exhibits advantages similar to those of the rotary magnetic head mechanisms of the preceding embodiments.

It is to be noted that a smooth curved face (not shown) having a curvature more moderate than that of the rotary drum DR may be applied in place of the smooth flat face (PL1 or PL2) of the flag head (FH1 or FH2) of any of the embodiments described above. Here, the smooth curved face is configured such that a tangential direction at least at one position thereon is perpendicular to a diametrical direction of the rotary drum DR.

The state of an air flow which provides a pressure reduction effect relies upon the shape and the smoothness of the face portion, and where the smoothness is the same, the pressure reduction effect by an air flow generated by a smooth curved face of a moderate curvature is higher than the pressure reduction effect by an air flow generated by a smooth curved face of a greater curvature. Accordingly, where a smooth curved face having a moderate curvature is used, since the tangential direction at least at one position on the face is perpendicular to a diametrical direction of the rotary drum DR, an air flow is formed in the same direction as the advancing direction of the head, and pressure reduction in accordance with the Bernoulli's theorem is caused by the air flow flowing along a narrow path between the magnetic tape MT and the smooth curved face of the moderate curvature. Consequently, the magnetic tape MT can be contacted with the head element (HE1 or HE2) by the pressure reduction.

Further, in the embodiments described above, a pair of channels (Ch11 and Ch12 or Ch21 and Ch22) are formed. However, another configuration is possible wherein the channels are omitted while a smooth flat face (the smooth flat face PL1 or PL2) or a moderate smooth curved face is formed over the entire areas in the window WD Where the configuration which does not include a channel in this manner is used, the smooth flat face is positioned on the inner circumference side retracted from the outer circumferential face of the rotary drum DR to form a recess. Accordingly, when the rotary drum DR rotates, the pressure in the recess is decreased so that the magnetic tape MT is attracted toward the smooth flat face PL1 of the rotary drum DR. It is apparent from the foregoing description given hereinabove with reference to FIG. 5 and the result of the experiment described hereinabove that the recess indicates such an attracting effect as just described. However, the attracting effect of the recess is not strong when compared with the attracting effect by the channel.

According to a recording and/or playback method for a tape-type magnetic recording medium of the present invention, as described hereinabove in connection with the embodiments of the present invention, it comprises the steps of trapping a magnetic tape around a cylindrical rotary drum including a magnetic head which has a smooth flat face extending perpendicularly to a diametrical direction of the rotary drum or a smoothed curved face having a curvature more moderate than that of the rotary drum and having a tangential direction at least at one position thereof which extends perpendicularly to a diametrical direction of the rotary drum, the magnetic head being disposed such that the smooth flat face or smooth curved face is exposed at a position on the inner circumferential side retracted from an outer circumferential face of the rotary drum, the smooth flat face or smooth curved face having a recording and/or playback element disposed thereon for magnetically interfering with the magnetic tape, and causing the magnetic tape to contact with the recording and/or playback element by pressure reduction caused by fluidic interference between the smooth flat face or smooth curved face and the magnetic tape to execute at least one of recording and playback of the magnetic tape.

Accordingly, in the recording and/or playback method, the smooth flat face or smoothed curved face having a moderate curvature is positioned on the inner circumferential side retracted from the outer circumferential face of the rotary drum so as to form a recessed portion. When the drum rotates, the pressure within the recessed portion is reduced, and consequently, the magnetic tape is attracted toward the smooth flat face or smooth curved face of the rotary drum.

Since the smooth flat face extends perpendicularly to a diametrical direction of the rotary drum or the smoothed curved face has a tangential direction at least at one position thereof which extends perpendicularly to a diametrical direction of the rotary drum, when the rotary drum rotates, the smooth flat face or smooth curved face advances in a direction perpendicular to a diametrical direction of the rotary drum, whereupon an air flow is formed in the advancing direction on the smooth flat face or smooth curved face.

When the magnetic tape approaches the smooth flat face or the smooth curved face by the attraction described above, the air flow flows along a narrow path defined by the magnetic tape and the smooth flat face or by the magnetic tape and the smooth curved face. As a result, pressure reduction in accordance with the Bernoulli's theorem occurs with the air flow, and due to the pressure reduction effect, the magnetic tape gradually approaches and contacts with the smooth flat face or smooth curved face. Consequently, the magnetic tape contacts with a contact pressure with the recording and/or playback element.

In this manner, the tape-type magnetic recording medium can be contacted with the smooth flat face with a suitable contact pressure only by the pressure reduction effect of the air flow generated naturally by the advancement of the smooth flat face or smooth curved face without applying compulsory force to the tape-type magnetic recording medium. Consequently, recording or playback can be performed while suppressing abrasion of the tape-type magnetic recording medium and the magnetic head.

According to another recording and/or playback method for a tape-type magnetic recording medium of the present invention, it comprises the steps of wrapping the magnetic tape around a rotary drum having an outer circumferential face along which a magnetic tape can be wrapped and having a window portion formed in a concave state on the outer circumferential face thereof, the rotary drum including a magnetic head which has a smooth flat face of a size smaller than the window portion or a smoothed curved face having a curvature more moderate than that of the rotary drum, the rotary drum being disposed in the window portion such that the smooth flat face or smooth curved face is exposed at a position on the inner circumferential side retracted from an outer circumferential face of the rotary drum with a pair of air gaps formed between the magnetic head and the opposite ends of the window portion, the smooth flat face extending perpendicularly to a diametrical direction of the rotary drum or the smooth curved face having a tangential direction at least at one position thereof which extends perpendicularly to a diametrical direction of the rotary drum, the smooth flat face or smooth curved face having a recording and/or playback element disposed thereon for magnetically interfering with the magnetic tape, and causing the magnetic tape to contact with the recording and/or playback element by pressure reduction caused by fluidic interference between the smooth flat face or smooth curved face and the magnetic tape to execute at least one of recording and playback of the magnetic tape.

In the recording and/or playback method described above, when the rotary drum rotates, the pressures within the air gaps formed between the opposite ends of the smooth flat face or smooth curved face and the opposite ends of the window portion are reduced. Consequently, the magnetic tape is effectively attracted toward the smooth flat face or smooth curved face of the rotary drum.

Since the smooth flat face extends perpendicularly to a diametrical direction of the rotary drum or the smoothed curved face has a tangential direction at least at one position thereof which extends perpendicularly to a diametrical direction of the rotary drum, when the rotary drum rotates, the smooth flat face or smooth curved face advances in a direction perpendicular to a diametrical direction of the rotary drum, whereupon an air flow is formed in the advancing direction on the smooth flat face or smooth curved face.

When the magnetic tape approaches the smooth flat face or smooth curved face, which is positioned on the inner circumferential side retracted from the outer circumferential face of the rotary drum, by the attraction described above, the air flow flows along a narrow path defined by the magnetic tape and the smooth flat face or by the magnetic tape and the smooth curved face. As a result, pressure reduction in accordance with the Bernoulli's theorem occurs with the air flow, and due to the pressure reduction effect, the magnetic tape gradually approaches and contacts with the smooth flat face or smooth curved face. Consequently, the magnetic tape contacts with a contact pressure with the recording and/or playback element.

In this manner, the magnetic tape can be contacted with the smooth flat face or smooth curved face with a suitable contact pressure only by the pressure reduction effect of the air flow generated naturally by the advancement of the smooth flat face or smooth curved face without applying compulsory force to the magnetic tape. Consequently, recording or playback can be performed while suppressing abrasion of the magnetic tape and the magnetic head.

While preferred embodiments of the present invention have been described using specific terms, such description is for illustrative purposes only, and it is to be understood that changes and variations may be made without departing from the spirit or scope of the following claims.

What is claimed is:

1. A magnetic head mounted on a rotary drum having an outer circumferential face along which a tape-type magnetic recording medium can be wrapped such that said magnetic head moves by rotation of said rotary drum and contacts with the tape-type magnetic recording medium to record or play back the tape-type magnetic recording medium, comprising:

a face portion opposing to the tape-type magnetic recording medium when said magnetic head moves; and a recording and/or playback element for contacting with the tape-type magnetic recording medium to perform at least one of magnetic recording and playback of the tape-type magnetic recording medium;

said face portion being a smooth flat face which extends perpendicularly to a diametrical direction of said rotary drum and is positioned on the inner circumferential side retracted from the outer circumferential face of said rotary drum;

said recording and/or playback element being disposed within a range of said face portion within which the tape-type magnetic recording medium contacts.

2. A magnetic head according to claim 1, wherein said face portion is formed from a smooth curved face having a curvature more moderate than that of said rotary drum and having a tangential direction at least at one position on said smooth curved face which extends perpendicularly to a diametrical direction of said rotary drum.

3. A magnetic head mounted on a rotary drum having an outer circumferential face along which a tape-type magnetic recording medium can be wrapped such that said magnetic head is smaller in size than and is disposed in an exposed state in a window portion formed in a concave state on the outer circumferential face of said rotary drum with a pair of air gaps formed between said magnetic head and the opposite ends of said window portion and that said magnetic head moves by rotation of said rotary drum and contacts with the tape-type magnetic recording medium to record or play back the tape-type magnetic recording medium, comprising:

a face portion opposing to the tape-type magnetic recording medium when said magnetic head moves; and a recording and/or playback element for contacting with the tape-type magnetic recording medium to perform at least one of magnetic recording and playback of the tape-type magnetic recording medium;

said face portion being a smooth flat face which extends perpendicularly to a diametrical direction of said rotary drum and is positioned on the inner circumferential side retracted from the outer circumferential face of said rotary drum;

said recording and/or playback element being disposed within a range of said face portion within which the tape-type magnetic recording medium contacts.

4. A magnetic head according to claim 3, wherein said face portion is formed from a smooth curved face having a curvature more moderate than that of said rotary drum and having a tangential direction at least at one position on said smooth curved face which extends perpendicularly to a diametrical direction of said rotary drum.

5. A recording and/or playback method for a tape-type magnetic recording medium, comprising the steps of:

wrapping the tape-type magnetic recording medium around a cylindrical rotary drum including a magnetic head which has a smooth flat face extending perpendicularly to a diametrical direction of said rotary drum or a smoothed curved face having a curvature more moderate than that of said rotary drum and having a tangential direction at least at one position thereof which extends perpendicularly to a diametrical direction of said rotary drum, said magnetic head being disposed such that said smooth flat face or smooth curved face is exposed at a position on the inner circumferential side retracted from an outer circumferential face of said rotary drum, said smooth flat face or smooth curved face having a recording and/or playback element disposed thereon for magnetically interacting with the tape-type magnetic recording medium; and causing the tape-type magnetic recording medium to contact with said recording and/or playback element by pressure reduction caused by fluidic interference between said smooth flat face or smooth curved face and the tape-type magnetic recording medium to execute at least one of recording and playback of the tape-type magnetic recording medium.

6. A recording and/or playback method for a tape-type magnetic recording medium, comprising the steps of:

wrapping the tape-type magnetic recording medium around a rotary drum having an outer circumferential face along which a tape-type magnetic recording medium can be wrapped and having a window portion formed in a concave state on the outer circumferential face thereof, said rotary drum including a magnetic head which has a smooth flat face of a size smaller than said window portion or a smoothed curved face having a curvature more moderate than that of said rotary drum, said magnetic head being disposed in said window portion such that said smooth flat face or smooth curved face is exposed at a position on the inner circumferential side retracted from an outer circumferential face of said rotary drum with a pair of air gape formed between said magnetic head and the opposite ends of said window portion, said smooth flat face extending perpendicularly to a diametrical direction of said rotary drum or said smooth curved face having a tangential direction at least at one position thereof which extends perpendicularly to a diametrical direction of said rotary drum, said smooth flat face or smooth curved face having a recording and/or playback element disposed thereon for magnetically interacting with the tape-type magnetic recording medium; and causing the tape-type magnetic recording medium to contact with said recording and/or playback element by pressure reduction caused by fluidic interference between said smooth flat face or smooth curved face and the tape-type magnetic recording medium to execute at least one of recording and playback of the tape-type magnetic recording medium.

7. A rotary magnetic head mechanism, comprising:

a rotary drum mounted for rotation and having an outer circumferential face along which a tape-type magnetic recording medium can be wrapped; and a magnetic head mounted on said rotary drum and having a face portion movable by rotation of said rotary drum and opposing to the tape-type magnetic recording medium to fluidically interfere with the tape-type magnetic recording medium and a recording and/or playback element for contacting and magnetically interacting with the tape-type magnetic recording medium;

said face portion being a smooth flat face which extends perpendicularly to a diametrical direction of said rotary drum and is positioned on the inner circumferential side retracted from the outer circumferential face of said rotary drum;

said recording and/or playback element being disposed within a range of said face portion within which the tape-type magnetic recording medium contacts said face portion with fluidic interference.

8. A rotary magnetic head mechanism according to claim 7, wherein said face portion opposing to the tape-type magnetic recording medium is formed from a smooth curved face having a curvature more moderate than that of said rotary drum.

9. A rotary magnetic head mechanism, comprising:

a cylindrical rotary drum having an outer circumferential face along which a tape-type magnetic recording medium can be wrapped and which rotates at a predetermined linear velocity in a tangential direction and a window portion formed in a concave state on said outer circumferential face; and a magnetic head having a size smaller than said window portion and disposed in said window portion such that a pair of air gaps having an equal width are formed between the opposite leading and trailing ends of said magnetic head and the opposite leading and trailing ends of said window portion, respectively, said magnetic head advancing in a predetermined advancing direction by rotation of said outer circumferential face of said rotary drum;

said magnetic head having a smooth flat face which extends perpendicularly to a diametrical direction of said rotary drum and is positioned on the inner circumferential side retracted from the outer circumferential face of said rotary drum such that said smooth flat face moves by rotation of said rotary drum and is opposed to the tape-type magnetic recording medium to fluidically interfere with the tape-type magnetic recording medium and a recording and/or playback element disposed on the trailing side with respect to the center on said smooth flat face in the advancing direction for contacting and magnetically interacting with the tape-type magnetic recording medium to execute at least one of recording and playback of the tape-type magnetic recording medium.

10. A rotary magnetic head mechanism according to claim 9, wherein said face portion opposing to the tape-type magnetic recording medium is formed from a smooth curved face having a curvature more moderate than that of said rotary drum.

11. A rotary magnetic head mechanism according to claim 9, wherein said smooth flat face is disposed in a displaced relationship to the outer circumference side until the tape-type magnetic recording medium having been contacted with and then spaced away from said smooth flat face passes by the trailing end of said window portion without colliding or contacting with the trailing end of said window portion.

12. A rotary magnetic head mechanism according to claim 11, wherein said face portion opposing to the tape-type magnetic recording medium is formed from a smooth curved face having a curvature more moderate than that of said rotary drum.

13. A rotary magnetic head mechanism, comprising:

a cylindrical rotary drum having an outer circumferential face along which a tape-type magnetic recording medium can be wrapped and which rotates at a predetermined linear velocity in a tangential direction and a window portion formed in a concave state on said outer circumferential face; and a magnetic head having a size smaller than said window portion and disposed in said window portion such that an air gap formed between a leading end of said magnetic head and a leading end of said magnetic head and a leading end of said window portion has a width smaller than that of another air gap formed between a trailing end of said magnetic head and a trailing end of said window portion, said magnetic head advancing in a predetermined advancing direction by rotation of said outer circumferential face of said rotary drum;

said magnetic head having a smooth flat face which extends perpendicularly to a diametrical direction of said rotary drum and is position on the inner circumferential side retracted from the outer circumferential face of said rotary drum such that said smooth flat face moves by rotation of said rotary drum and is opposed to the tape-type magnetic recording medium to fluidically interfere with the tape-type magnetic recording medium and a recording and/or playback element disposed within a range on said face portion within which the tape-type magnetic recording medium contacts with said face portion with fluidic interference for contacting and magnetically interacting with the tape-type magnetic recording medium to executive at least one of recording and playback of the tape-type magnetic recording medium.

14. A rotary magnetic head mechanism according to claim 13, wherein said face portion opposing to the tape-type magnetic recording medium is formed from a smooth curved face having a curvature more moderate than that of said rotary drum and having a tangential direction at least at one position thereof which extends perpendicularly to a diametrical direction of said rotary drum.

* * * * *